United States Patent
Hansen et al.

(10) Patent No.: US 9,129,464 B2
(45) Date of Patent: Sep. 8, 2015

(54) STAGED TRANSACTIONS SYSTEMS AND METHODS

(75) Inventors: Kurt L. Hansen, Castle Rock, CO (US); Thomas B. Sayor, Castle Rock, CO (US); Sharon K. Vialpando, Lone Tree, CO (US); Ken Algiene, Littleton, CO (US)

(73) Assignee: The Western Union Company, Englewood, CO (US)

( * ) Notice: Subject to any disclaimer, the term of this patent is extended or adjusted under 35 U.S.C. 154(b) by 2100 days.

(21) Appl. No.: 11/497,813

(22) Filed: Aug. 1, 2006

(65) Prior Publication Data

US 2007/0016526 A1 Jan. 18, 2007

Related U.S. Application Data

(63) Continuation of application No. 10/444,111, filed on May 21, 2003, now Pat. No. 7,184,989, which is a continuation-in-part of application No. 10/112,258, filed on Mar. 29, 2002, now Pat. No. 7,107,249, which (Continued)

(51) Int. Cl.
*G06Q 20/00* (2012.01)
*G06Q 40/00* (2012.01)

(Continued)

(52) U.S. Cl.
CPC .................. *G07F 7/02* (2013.01); *G06Q 20/02* (2013.01); *G06Q 20/04* (2013.01); *G06Q 20/042* (2013.01); *G06Q 20/085* (2013.01); *G06Q 20/0855* (2013.01); *G06Q 20/10* (2013.01); *G06Q 20/102* (2013.01); *G06Q 20/105* (2013.01); *G06Q 20/108* (2013.01); *G06Q 20/1085* (2013.01); *G06Q 20/12* (2013.01); *G06Q 20/20* (2013.01); *G06Q 20/28* (2013.01); *G06Q 20/342* (2013.01);

(Continued)

(58) Field of Classification Search
USPC ........................................ 705/50–79
See application file for complete search history.

(56) References Cited

U.S. PATENT DOCUMENTS

| | | |
|---|---|---|
| 3,599,151 A | 8/1971 | Harr |
| 3,783,755 A | 1/1974 | Lagin |

(Continued)

FOREIGN PATENT DOCUMENTS

| | | |
|---|---|---|
| EP | 0 481 135 A1 | 4/1992 |
| EP | 0 700 023 A1 | 8/1995 |

(Continued)

OTHER PUBLICATIONS

USPTO; Non-Final Office Action mailed Mar. 18, 2009 for U.S. Appl. No. 11/536,563.

(Continued)

*Primary Examiner* — James A Reagan
(74) *Attorney, Agent, or Firm* — Kilpatrick Townsend & Stockton LLP

(57) ABSTRACT

Systems and methods for accepting payments for goods and services provided by a merchant. In one embodiment, a method for accepting payments from a consumer for a good or service provided by a merchant comprises receiving a transaction request from the merchant, receiving a payment from the consumer, associating the payment with the transaction request, and sending at least a portion of the payment to the merchant. In this manner, the merchant stages the transaction, and the consumer completes the transaction by making the payment. An optional time limit feature also may be used, and the transaction may be staged by the consumer, or others.

23 Claims, 11 Drawing Sheets

Related U.S. Application Data is a continuation-in-part of application No. 10/007,701, filed on Dec. 10, 2001, now Pat. No. 7,158,955, and a continuation-in-part of application No. 09/990,702, filed on Nov. 9, 2001, now Pat. No. 7,092,916, which is a continuation-in-part of application No. 09/823,697, filed on Mar. 31, 2001, now Pat. No. 7,165,052.

(51) Int. Cl.

| | | |
|---|---|---|
| *G06Q 20/12* | (2012.01) | |
| *G06Q 20/02* | (2012.01) | |
| *G06Q 20/10* | (2012.01) | |
| *G06Q 30/06* | (2012.01) | |
| *G06Q 20/38* | (2012.01) | |
| *G07F 7/02* | (2006.01) | |
| *G06Q 20/34* | (2012.01) | |
| *G06Q 20/36* | (2012.01) | |
| *G06Q 30/02* | (2012.01) | |
| *G06Q 20/04* | (2012.01) | |
| *G06Q 20/08* | (2012.01) | |
| *G06Q 20/40* | (2012.01) | |
| *G06Q 20/20* | (2012.01) | |
| *G06Q 30/04* | (2012.01) | |
| *G06Q 20/28* | (2012.01) | |

(52) U.S. Cl.
CPC .......... *G06Q 20/3433* (2013.01); *G06Q 20/367* (2013.01); *G06Q 20/3672* (2013.01); *G06Q 20/3674* (2013.01); *G06Q 20/383* (2013.01); *G06Q 20/385* (2013.01); *G06Q 20/3821* (2013.01); *G06Q 20/40* (2013.01); *G06Q 20/401* (2013.01); *G06Q 30/0207* (2013.01); *G06Q 30/0277* (2013.01); *G06Q 30/04* (2013.01); *G06Q 30/0601* (2013.01); *G06Q 40/00* (2013.01); *G07F 7/025* (2013.01)

(56) References Cited

U.S. PATENT DOCUMENTS

| | | | |
|---|---|---|---|
| 3,833,395 | A | 9/1974 | Gosnell |
| 4,032,931 | A | 6/1977 | Haker |
| 4,321,672 | A | 3/1982 | Braun et al. |
| 4,385,285 | A | 5/1983 | Horst et al. |
| 4,454,414 | A | 6/1984 | Benton |
| 4,562,340 | A | 12/1985 | Tateisi et al. |
| 4,562,341 | A | 12/1985 | Ohmae et al. |
| 4,630,200 | A | 12/1986 | Ohmae et al. |
| 4,678,895 | A | 7/1987 | Tateisi et al. |
| 4,722,554 | A | 2/1988 | Pettit |
| 4,795,892 | A | 1/1989 | Gilmore et al. |
| 4,812,628 | A | 3/1989 | Boston et al. |
| 4,823,264 | A | 4/1989 | Deming |
| 4,902,881 | A | 2/1990 | Janku |
| 4,961,142 | A | 10/1990 | Elliott et al. |
| 4,972,318 | A | 11/1990 | Brown et al. |
| 5,021,967 | A | 6/1991 | Smith |
| 5,053,607 | A | 10/1991 | Carlson et al. |
| 5,119,293 | A | 6/1992 | Hammond |
| 5,175,682 | A | 12/1992 | Higashiyama et al. |
| 5,220,501 | A | 6/1993 | Lawlor et al. |
| 5,283,829 | A | 2/1994 | Anderson |
| 5,350,906 | A | 9/1994 | Brody et al. |
| 5,367,452 | A | 11/1994 | Gallery et al. |
| 5,408,077 | A | 4/1995 | Campo et al. |
| 5,426,594 | A | 6/1995 | Wright et al. |
| 5,448,043 | A | 9/1995 | Nakano et al. |
| 5,461,217 | A | 10/1995 | Claus |
| 5,464,971 | A | 11/1995 | Sutcliffe et al. |
| 5,465,206 | A | 11/1995 | Hilt et al. |
| 5,477,037 | A | 12/1995 | Berger |
| 5,477,038 | A | 12/1995 | Levine et al. |
| 5,484,988 | A | 1/1996 | Hills et al. |
| 5,491,325 | A | 2/1996 | Huang et al. |
| 5,504,677 | A | 4/1996 | Pollin |
| 5,510,979 | A | 4/1996 | Moderi et al. |
| 5,513,117 | A | 4/1996 | Small |
| 5,524,073 | A | 6/1996 | Stambler |
| 5,546,523 | A | 8/1996 | Gatto |
| 5,550,734 | A | 8/1996 | Tarter et al. |
| 5,555,496 | A | 9/1996 | Tackbary et al. |
| 5,570,465 | A | 10/1996 | Tsakanikas |
| 5,577,109 | A | 11/1996 | Stimson et al. |
| 5,604,802 | A | 2/1997 | Holloway |
| 5,622,388 | A | 4/1997 | Alcordo |
| 5,629,982 | A | 5/1997 | Micali |
| 5,638,283 | A | 6/1997 | Herbert |
| 5,649,117 | A | 7/1997 | Landry |
| 5,650,604 | A | 7/1997 | Marcous et al. |
| 5,657,201 | A | 8/1997 | Kochis |
| 5,677,955 | A | 10/1997 | Doggett et al. |
| 5,679,940 | A | 10/1997 | Templeton et al. |
| 5,686,713 | A | 11/1997 | Rivera |
| 5,699,528 | A | 12/1997 | Hogan |
| 5,717,868 | A | 2/1998 | James |
| 5,721,768 | A | 2/1998 | Stimson et al. |
| 5,732,136 | A | 3/1998 | Murphree et al. |
| 5,732,400 | A | 3/1998 | Mandler et al. |
| 5,745,886 | A | 4/1998 | Rosen |
| 5,757,917 | A | 5/1998 | Rose et al. |
| 5,764,888 | A | 6/1998 | Bolan et al. |
| 5,774,879 | A | 6/1998 | Custy et al. |
| 5,778,067 | A | 7/1998 | Jones et al. |
| 5,779,379 | A | 7/1998 | Mason et al. |
| 5,783,808 | A | 7/1998 | Josephson |
| 5,787,403 | A | 7/1998 | Randle |
| 5,794,207 | A | 8/1998 | Walker et al. |
| 5,799,072 | A | 8/1998 | Vulcan et al. |
| 5,815,657 | A | 9/1998 | Williams et al. |
| 5,825,617 | A | 10/1998 | Kochis et al. |
| 5,826,241 | A | 10/1998 | Stein et al. |
| 5,828,875 | A | 10/1998 | Halvarsson et al. |
| 5,832,463 | A | 11/1998 | Funk |
| 5,870,718 | A | 2/1999 | Spector |
| 5,875,435 | A | 2/1999 | Brown |
| 5,878,211 | A | 3/1999 | Delagrange et al. |
| 5,880,446 | A | 3/1999 | Mori et al. |
| 5,893,080 | A | 4/1999 | McGurl et al. |
| 5,896,298 | A | 4/1999 | Richter |
| 5,897,625 | A | 4/1999 | Gustin et al. |
| 5,897,989 | A | 4/1999 | Beecham |
| 5,898,154 | A | 4/1999 | Rosen |
| 5,899,980 | A | 5/1999 | Wilf et al. |
| 5,899,982 | A | 5/1999 | Randle |
| 5,902,983 | A | 5/1999 | Crevelt et al. |
| 5,903,633 | A | 5/1999 | Lorsch |
| 5,903,881 | A | 5/1999 | Schrader et al. |
| 5,909,492 | A | 6/1999 | Payne et al. |
| 5,909,673 | A | 6/1999 | Gregory |
| 5,910,988 | A | 6/1999 | Ballard |
| 5,913,202 | A | 6/1999 | Motoyama |
| 5,915,023 | A | 6/1999 | Bernstein |
| 5,920,629 | A | 7/1999 | Rosen |
| 5,920,847 | A | 7/1999 | Kolling et al. |
| 5,920,848 | A | 7/1999 | Schutzer et al. |
| 5,923,016 | A | 7/1999 | Fredregill et al. |
| 5,937,396 | A | 8/1999 | Konya |
| 5,949,044 | A | 9/1999 | Walker et al. |
| 5,952,639 | A | 9/1999 | Ohki et al. |
| 5,953,709 | A | 9/1999 | Gilbert et al. |
| 5,953,710 | A | 9/1999 | Fleming |
| 5,960,412 | A | 9/1999 | Tackbary et al. |
| 5,963,647 | A | 10/1999 | Downing et al. |
| 5,974,146 | A | 10/1999 | Randle et al. |
| 5,974,194 | A | 10/1999 | Hirani et al. |
| RE36,365 | E | 11/1999 | Levine et al. |
| 5,987,426 | A | 11/1999 | Goodwin, III |
| 5,993,047 | A | 11/1999 | Novogrod et al. |
| 5,999,624 | A | 12/1999 | Hopkins |
| 6,003,763 | A | 12/1999 | Gallagher et al. |

(56) References Cited

U.S. PATENT DOCUMENTS

| | | |
|---|---|---|
| 6,011,833 A | 1/2000 | West |
| 6,012,048 A | 1/2000 | Gustin et al. |
| 6,015,087 A | 1/2000 | Seifert et al. |
| 6,018,724 A | 1/2000 | Arent |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,047,268 A | 4/2000 | Bartoli et al. |
| 6,058,417 A | 5/2000 | Hess et al. |
| 6,064,990 A | 5/2000 | Goldsmith |
| 6,070,150 A | 5/2000 | Remington et al. |
| 6,070,156 A | 5/2000 | Hartsell, Jr. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Mersky et al. |
| 6,119,931 A | 9/2000 | Novogrod |
| 6,122,625 A | 9/2000 | Rosen |
| 6,128,603 A | 10/2000 | Dent et al. |
| 6,134,561 A | 10/2000 | Brandien et al. |
| 6,145,738 A | 11/2000 | Stinson et al. |
| 6,148,377 A | 11/2000 | Carter et al. |
| 6,149,055 A | 11/2000 | Gatto |
| 6,149,056 A | 11/2000 | Stinson et al. |
| 6,164,528 A | 12/2000 | Hills et al. |
| 6,167,386 A | 12/2000 | Brown |
| 6,175,823 B1 | 1/2001 | Van Dusen |
| 6,189,787 B1 | 2/2001 | Dorf |
| 6,193,152 B1 | 2/2001 | Fernando et al. |
| 6,199,761 B1 | 3/2001 | Drexler |
| 6,202,054 B1 | 3/2001 | Lawlor et al. |
| 6,206,283 B1 | 3/2001 | Bansal et al. |
| RE37,122 E | 4/2001 | Levine et al. |
| 6,223,168 B1 | 4/2001 | McGurl et al. |
| 6,246,996 B1 | 6/2001 | Stein et al. |
| 6,247,047 B1 | 6/2001 | Wolff |
| 6,260,024 B1 | 7/2001 | Shkedy |
| 6,263,446 B1 | 7/2001 | Kausik et al. |
| 6,269,369 B1 | 7/2001 | Robertson |
| 6,275,829 B1 | 8/2001 | Angiulo et al. |
| 6,282,522 B1 | 8/2001 | Davis et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,987 B1 | 11/2001 | Watanabe et al. |
| 6,327,570 B1 | 12/2001 | Stevens |
| 6,327,575 B1 | 12/2001 | Katz |
| 6,334,108 B1 | 12/2001 | Deaton et al. |
| 6,343,279 B1 | 1/2002 | Bissonette et al. |
| 6,347,305 B1 | 2/2002 | Watkins |
| 6,360,254 B1 | 3/2002 | Linden et al. |
| 6,363,357 B1 | 3/2002 | Rosenberg et al. |
| 6,367,693 B1 | 4/2002 | Novogrod |
| 6,386,444 B1 | 5/2002 | Sullivan |
| 6,394,343 B1 | 5/2002 | Berg et al. |
| 6,396,531 B1 | 5/2002 | Gersberg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass et al. |
| 6,449,599 B1 | 9/2002 | Payne et al. |
| 6,453,300 B2 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,747 B1 | 1/2003 | Stoutenburg et al. |
| 6,510,453 B1 | 1/2003 | Apfel et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,601,038 B1 | 7/2003 | Kolls |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B2 | 5/2004 | Cooper et al. |
| 6,761,309 B2 | 7/2004 | Stoutenburg et al. |
| 6,761,311 B1 | 7/2004 | Algiene et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,847,947 B1 | 1/2005 | Kambour et al. |
| 6,886,742 B2 | 5/2005 | Stoutenburg et al. |
| 6,908,031 B2 | 6/2005 | Seifert et al. |
| 6,922,673 B2 | 7/2005 | Karas et al. |
| 2001/0032878 A1 | 10/2001 | Tsiounis et al. |
| 2001/0042785 A1 | 11/2001 | Walker et al. |
| 2001/0051876 A1 | 12/2001 | Seigel et al. |
| 2001/0054003 A1 | 12/2001 | Chien et al. |
| 2002/0004909 A1* | 1/2002 | Hirano et al. ............... 713/200 |
| 2002/0016769 A1 | 2/2002 | Barbara et al. |
| 2002/0023055 A1 | 2/2002 | Antognini et al. |
| 2002/0032653 A1 | 3/2002 | Schutzer |
| 2002/0046106 A1 | 4/2002 | Ishibashi et al. |
| 2002/0062285 A1 | 5/2002 | Amann |
| 2002/0069166 A1* | 6/2002 | Moreau et al. ............... 705/40 |
| 2002/0076018 A1 | 6/2002 | Banks et al. |
| 2002/0087337 A1 | 7/2002 | Hensley |
| 2002/0087462 A1 | 7/2002 | Stoutenburg et al. |
| 2002/0087463 A1 | 7/2002 | Fitzgerald et al. |
| 2002/0087467 A1 | 7/2002 | Mascavage et al. |
| 2002/0087469 A1 | 7/2002 | Ganesan et al. |
| 2002/0104026 A1 | 8/2002 | Barra et al. |
| 2002/0111886 A1* | 8/2002 | Chenevich et al. ............ 705/30 |
| 2002/0111908 A1 | 8/2002 | Milberger et al. |
| 2002/0143566 A1 | 10/2002 | Diveley et al. |
| 2002/0143706 A1 | 10/2002 | Diveley et al. |
| 2002/0143709 A1 | 10/2002 | Diveley et al. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2002/0169719 A1 | 11/2002 | Dively et al. |
| 2003/0024979 A1 | 2/2003 | Hansen et al. |
| 2003/0028491 A1 | 2/2003 | Cooper |
| 2003/0050803 A1* | 3/2003 | Marchosky ............... 705/3 |
| 2003/0051054 A1* | 3/2003 | Redlich et al. ............... 709/246 |
| 2003/0055689 A1 | 3/2003 | Block et al. |
| 2003/0055780 A1 | 3/2003 | Hansen et al. |
| 2003/0061171 A1 | 3/2003 | Gilbert et al. |
| 2003/0069856 A1 | 4/2003 | Seifert et al. |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |

(56) References Cited

U.S. PATENT DOCUMENTS

| | | | |
|---|---|---|---|
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0015438 A1 | 1/2004 | Compiano |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0088248 A1 | 5/2004 | Cutler |
| 2004/0088261 A1 | 5/2004 | Moore et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Mascavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0167860 A1 | 8/2004 | Baxter et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene et al. |
| 2005/0017607 A1 | 1/2005 | Weinberger |
| 2005/0167481 A1 | 8/2005 | Hansen et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |
| 2006/0190564 A1* | 8/2006 | Arnold .......................... 709/219 |

FOREIGN PATENT DOCUMENTS

| | | | |
|---|---|---|---|
| EP | 700023 A1 * | 3/1996 | ................ G07F 7/08 |
| EP | 0 745 961 A2 | 4/1996 | |
| EP | 0 949 596 A2 | 10/1999 | |
| EP | 1 077 436 A2 | 2/2001 | |
| FR | 2728983 A1 | 7/1996 | |
| JP | 2008181346 A * | 8/2008 | |
| WO | WO 96/26508 A1 | 8/1996 | |
| WO | WO 98/49644 A1 | 11/1998 | |
| WO | WO 98/50875 A2 | 11/1998 | |
| WO | WO 99/22291 A1 | 5/1999 | |
| WO | WO 99/28872 A1 | 6/1999 | |
| WO | WO 00/22559 A1 | 4/2000 | |
| WO | WO 00/46725 A1 | 8/2000 | |
| WO | WO 00/54122 A2 | 9/2000 | |
| WO | WO 00/54122 A3 | 9/2000 | |
| WO | WO 00/67177 A2 | 11/2000 | |
| WO | WO 00/79452 A2 | 12/2000 | |
| WO | WO 01/04816 A1 | 1/2001 | |
| WO | WO 01/33522 A1 | 5/2001 | |
| WO | WO 01/39093 A1 | 5/2001 | |
| WO | WO 01/75744 A1 | 10/2001 | |
| WO | WO 01/86600 A2 | 11/2001 | |
| WO | WO 02/05195 A1 | 1/2002 | |

OTHER PUBLICATIONS

Hampe, J., Mobile Electronic Commerce: Reintermediation in the Payment System, 13th International Bled Electronic Commerce Conference, Jun. 2000.
Varshney U., Mobile Commerce: A New Frontier, 2000, IEEE.
"About Western Union: Company History"; http://www.payment-solutions.com/history.html, 2 pages.
"Aeromexico and Western Union Partner to Offer a Cash Payment Option for Booking Airline Tickets"; 2004, Press Release, 2 pages.
"American Express in New Ad Drive"; 1990, American Banker, 1 page.
"American Express Introduces Automated Money Order Dispenser"; 1991, Professional Check Casher, 1 page.
"American Express Money Orders, Travelers Cheques Now on Sale"; 1936, Dots and Dashes, 2 pages.
"American Express Unit Introduces State-Of-The-Art Automated Money Order Dispenser"; 1990, Tri-State Food News, 1 page.
"Amex aims expansion strategy at local currency exchanges"; 1990, Crain's Chicago Business, 1 page.
"Amex Money Order Dispenser"; 1990, The Nilson Report, 1 page.
"Amex tests Moneygram"; 1990, Adnews, 1 page.
"And a Nine-Second Money Order Dispenser"; 1991, Post-News, vol. 17, No. 1, 1 page.
"Announcing Quick Collect Online"; 2002, Western Union's Professional Collector, 3 pages.
"Annual Report of First Data Corporation"; 1998, 3 pages.
"Annual Report of First Data Corporation"; 1999, 2 pages.
"Annual Report of the President of the Western Union Telegraph Company"; 1873, pp. 8-11.
"Annual Report of the President of the Western Union Telegraph Company"; 1874, pp. 8-11.
"Annual Report of the Western Union Corporation"; 1990, 4 pages.
"Annual Report of the Western Union Telegraph Company"; 1935, 2 pages.
"Annual Report of the Western Union Telegraph Company"; 1940, pp. 9 and 22.
"Annual Report of the Western Union Telegraph Company"; 1947, 2 pages.
"Annual Report of the Western Union Telegraph Company"; 1949, 2 pages.
"Annual Report of the Western Union Telegraph Company"; 1951, 2 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 2 pages.
"Annual Report of the Western Union Telegraph Company"; 1981, 2 pages.
"AT&T Wireless to Offer Western Union SwiftPay as Replenishment Option for AT&T Free2Go Wireless Prepaid Customers"; 2001, PR Newswire Association, 2 pages.
"Behind the Scenes of Life"; 1996, First Data Corporation Annual Report, 3 pages.
"billserv.com Launches bills.com, an internet Portal for Consumers to Pay All Bills Online at No Cost"; 2000, Business Wire, 2 pages.
"CES/NaBANCO Introduces Stored Value Card Technology: Blockbuster Video is First Merchant Partner"; 1996, First Data Corporation News Release, 3 pages.
"Collect your delinquent accounts by Telegraph"; 1933, Form 1229-A, 1 page.
"Collection by Money Transfer: MoneyGram Service Removes Time-Consuming Steps to Commercial Collections"; 1990, Collector, p. 36.
"Common Values: Uncommon Opportunities"; 1995, First Data Corporation Annual Report, 2 pages.
"Company Profile: The Western Union Convenience Pay Service"; 2004, 4 pages.
"Dots and Dashes"; 1935, vol. 11, No. 9, 4 pages.
"FDR to Offer HNC Software's Real-Time Fraud Detection: New distribution Agreement to Benefit Card Banks"; 1996, First Data Resources News Release, 3 pages.
"Federal Benefits Checks are Going Away—Don't Let Your Customers Go with Them: Announcing the Western Union Benefits Quick Cash Program"; 4 pages.
"First Data Aligns with CyberCash to Offer New Electronic Coin Service"; 1996, First Data Corporation News Release, 3 pages.

(56) References Cited

OTHER PUBLICATIONS

"First Data and Netscape Announce Program to Help Businesses Establish Payment-Enabled Web Sites"; 1996, First Data Corporation News Release, 5 pages.
First Data and Netscape Offering Internet Payment Processing Service; 1996, First Data Corporation News Release, 3 pages.
"First Data InfoSource Offers Database Analysis with DecisionScope"; 1996, First Data Corporation News Release, 2 pages.
"First Data to Offer Card Profitability Software from HNC: Distribution Agreement Poised to Repeat Falcon Success";1996, HNC Software, Inc. News Release, 3 pages.
"First Data, First USA Paymentech, GE Capital Invest in First Virtual Holdings"; 1996, First Virtual Holdings Corporation News Release, 3 pages.
"First located example of a money transfer"; Aug. 25, 1873, 1 page.
"Get your Collect Card"; 1939, Dots and Dashes, 2 pages.
"Guess What? The check's not in the mail"; 2001, Western Union's Professional Collector, 3 pages.
"If you're not getting your payment with Quick Collect, chances are you're not getting it"; 2001, 2 pages.
"Introducing the Western Union Cash Card Program"; 1998, 2 pages.
"It takes a certain person to make a good collector. But it takes a good manager to make a champion"; 2001, Western Union's Professional Collector, 3 pages.
"Lan Airline Alliance Carriers and Western Union Offer Travelers Additional Payment Options"; 2005, 3 pages.
"LAN Airline Alliance Carriers and Western Union offer Travellers Additional Payment Options"; 2005, Press Release, 3 pages.
"Last of the Pony Express Riders Tells His Story"; 1932, Dots and Dashes, vol. 8, No. 10, 2 pages.
"Leading Provider of Transaction Card Processing Selects Connect Oneserver Software as a Solution for Advanced Internet Merchant Services: First Data Chooses OneServer as an Application to Deliver the Internet to Banks and Merchants"; 1996, press Release, 4 pages.
"Loved one stranded? Send Cash"; 1991, Akron Beacon Journal, 2 pages.
"Messenger Work Full of Adventure, Excitement"; 1933, Dots and Dashes, vol. 9, No. 11, 2 pages.
"Money-wire giants battle for business: Currency exchanges wooed"; 1991, Chicago Sun Times, 2 pages.
"MoneyZap.com Greeting Card Process Flow"; 2000, 2 pages.
"Nation Receives Time Over Western Union Network"; 1931, Dots and Dashes, vol. 7, No. 5, 2 pages.
"Nationwide Credit Collectors Act Globally", 2001, Western Union's Professional Collector, 3 pages.
"Netscape Announces Netscape Livepayment to Facilitate Internet Commerce"; 1996, Netscape News Release, 4 pages.
"New Western Union SwiftPay Service Continues Expansion of Consumer-to-Business Payment Options"; 1999, PR Newswire Association, 2 pages.
"NTS Completes Merger with EDS Fleet Services; New First Data Unit Sets Sights on New Markets"; 1996, NTS Press Release, 3 pages.
"Only Western Union"; 2 pages.
"PayPal: The way to send and receive money online"; 4 pages.
"PaySys signs up four Asian distributors"; 1997 Orlando Business Journal, 3 pages.
"Pilgrims Started Thanksgiving Custom"; Dots and Dashes, vol. IV, No. 11, 2 pages.
"Purchasing American Airlines Tickets Just Got Easier"; 2004, Press Release, 4 pages.
"Purchasing American Airlines Tickets Just Got Easier"; 2005, 4 pages.
"Quarterly Report, 1st Quarter of the Western Union Telegraph Company", 1978, 2 pages.
"Quick Cash and Quick Collect: Western Union's money-movers"; 1990, *Newsbriefs*, vol. 2, No. 1, 3 pages.
"Quick Collect Sales Presentation"; 28 pages.
"Quick Collect"; Western Union Training Guide; 2004, 10 pages.

Quick Collect: Government/Child Support Agency Name, Training Guide; 2004, 8 pages.
"Quick Pay: The Convenient and reliable way to receive payments from customers worldwide"; http://www.payment-solutions.com/quickpay.html, 3 pages.
"Refund of Money Transfers"; 1913, Journal of the Telegraph, 2 pages.
"Reynolds Arcade was Western Union Birthplace"; 1933, Dots and Dashes, vol. 9, No. 8, 2 pages.
"Rhode Island becomes first state to accept child support payments at Western Union: More than 50 Western Union Convenience Pay Agent Locations Offer New Level of Convenience to Rhode Island Residents Who Pay Child Support--"; 2002, 3 pages.
"Rhode Island becomes first state to accept child support payments at Western Union: Government Payment Leader govONE Solutions Adds Walk-in to Full Suite of Payment Options"; 2002, 3 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment Options"; 2002, Press Release, 3 pages.
"SBC Communications adds Western Union Locations for Walk-in Customer Bill Payments"; SBC News Release, 2 pages.
"SBC Communications Adds Western Union Locations for Walk-In Customer Bill Payments"; 2005, Press Release, 2 pages.
"Send your payment using Western Union Quick Collect"; 2 pages.
"Send Your Utility Bill Payment from Here!"; 3 pages.
"Sending Cash in a Flash"; 1990, Travel & Leisure, p. 42.
"Sending Cash in a Flash: There are more ways to do it than you might think"; 1991, 2 pages.
"Signature Services: Helping financial institutions send funds faster"; http://www.payment-solutions.com/signature.html, 1 page.
"State of Hawaii to Accept Child Support Payments at Western Union"; 2004, 2 pages.
"Stream, LitleNet, BBN, and KPMG Announce Industry-Wide Initiative to Enable Wide-Scale Software Electronic Commerce"; 1996, News Release, 6 pages.
"The Western Union Telegraph Company: Delivery Department Instructions"; 1926, Commercial Bulletin No. 9-A, 2 pages.
"The Western Union Telegraph Company: Rules for Money Transfer Service"; 1908, pp. 3-25.
"The Western Union Telegraph Company:Instructions for Receiving Clerks"; 1929, Commercial Bulletin No. 37-A, 2 pages.
"The Yellow Blank is Correct for every social need"; 1930, Western Union Booklet, 2 pages.
"The Yellow Blank: When, Why, How to Use It"; 1934, 5 pages.
"There's a lot to be said about the many advantages of the Quick Collect service. And look who's saying it."; 4 pages.
"To send a Quick Collect Payment"; sample form, 1 page.
"VIPS Introduces MCSource to Managed Healthcare Industry"; 1996, VIPS Healthcare Information Systems News Release, 2 pages.
"Western Union and Continental Airlines Introduce New Quick and Easy Cash Payment Option When Booking Flights"; 2004, Press Release, 4 pages.
"Western Union Creates Phone Card with BLT Technologies"; 1997, PR Newswire Association, 2 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Western Union Gift Greetings"; 6 pages.
"Western Union Money Orders More Popular Than Ever": 1942, Dots and Dashes, vol. 18, No. 3, 2 pages.
"Western Union Money Transfer Services, Send Money Online, Money Orders, Send Telegrams"; http://www.westernunion.com/info/osCompareMoneyMessage.asp, 2 pages.
"Western Union Payment Services, Bidpay and Quick Collect, Online Bill Payment, Online Auction Payments"; http://www.westernunion.com/info/osComparePayment.asp, 2 pages.

(56) References Cited

OTHER PUBLICATIONS

"Western Union Products and Services: a brief description"; 1960, 22 pages.
"Western Union Quick Collect"; 2 pages.
"Western Union Quick Collect: The most agents, the most locations, the most experienced"; 2000, 2 pages.
"Western Union Quick Collect; 3 Easy Ways to Send a Payment: In Person, Online or by Phone!"; 2 pages.
"Western Union SwiftPay Selected by Sheakley Uniservice to Complete W-2 Reprint Transactions"; 2000, PR Newswire Association, 2 pages.
"Western Union/Money Zap: Send and receive money easily over the internet"; http://www.moneyzap.com/main.asp, 23 pages.
"Western Union: Ford Credit Phone Pay—How does it work?," 2001, 1 page.
"Western Union: Now, using our service is even more rewarding"; 1 page.
"Western Union: Some Quick Facts about Quick Collect"; 1 page.
"Western Union's Would-Be Rival"; 1990, American Banker, 1 page.
"When you're helping a customer make a crucial payment there's no room for guesswork"; 2002, Western Union's Professional Collector, 3 pages.
"Why Send Your Customers Across Town When You Can Send Them Next Door?", 2005, 1 page.
You're sending more than a payment: Point-of-Sale & Merchandising Support Advertising Materials, 2 pages.
"You're sending more than a payment: You're sending peace of mind"; 2004, 3 pages.
American Greeting Cards Click-Through; 38 pages.
Anonymous, "Payment Systems: Western Union Service for Overdue Accounts Resolving Delinquent Cards," Card News, Potomac, Aug. 13, 1990, vol. 5, Issue 15, p. 4.
Anonymous, "Western Union Service Growing," Bank Letter, New York, May 28, 1990, vol. 14, Issue 21, p. 8.
bidpay.com: Whois search results; 2003, http://www.networksolutions.com/en_US/whois/results.jhtml;jsessionid+VZDZVYDD1J, 2 pages.
Bid Pay: Seller FAQs—Receiving Payments and Using the Money Order Service; 7 pages.
Boner, Dan: "Beaming Money by Email is Web's Next Killer App"; 1999, PR Newswire, 4 pages.
Business Wire, "E-Commerce, Email and E-greeting Cards Combine in New Web Site Designed by Interactive Bureau; Flooz.com Features a Fun Online Gift Currency You Send by Email for Any Occasion," downloaded from website http://www.proquest.umi.com, 2 pages.
Candygram payment service, 1 page.
Cornwell, Ted, Western Union Reports Growth in Large Payment Collection Service, National Mortgage News, New York, May 5, 1997, vol. 21, Issue 31, p. 64.
DOTBANK, *The Way to Send and Receive Money on the Internet*, downloaded from website http://www.dotbank.com, Feb. 7, 2000, 7 pages.
First Data Acquires PaySys International; 2001, Press Release, 2 pages.
Gift: Money Order for something you really want: 1933, 1 page.
Hoffman, Karen Epper; "PayPal Still Running Free"; 2003, Bank Technology News, 3 pages.
Holiday Greeting by Western Union; 1933, 1 page.
How money by phone was paid;; Money Transfer Service: Book of Rules and List of Offices; 1926, Western Union Telegraph Company, 3 pages.
http://www.vfi-finance.com/tranz330.htm, Tranz 330 Fast, Low-Cost Transaction Automation at the Point of Service, VeriFone Finance, Jan. 1999, pp. 1-3, especially pp. 1-2, 2 pages.
Latour, Almar; "PayPal Electronic Plan May be on the Money in Years to Come"; 1999, The Wall Street Journal, 2 pages.
Lawton, George; "Biometrics: A New Era in Security", 1998, Computer, vol. 31, No. 8, pp. 16-18.
Levin, Gary; "Western Union not fading into sunset; new services are added as telegrams drop"; 1992, 2 pages.
List of Prepaid Services; http://www.westernunion.com/info/osComparePrePaid.asp, 1 page.
Luxury Brands LLC: WOrld Famous Brands at Liquidation Proces; http://www.auctionbytes.com/cab/pp./payment, 3 pages.
Money Order with confirmation; 1948, 1 page.
Money Orders by Phone; 1935, Fortune Magazine, 3 pages.
O'Mahony, Donald, "Electronic Payment Systems," Artech House Inc., Norwood, MA, 1997, pp. 19-237.
PayPal for the Palm; http://handheldnews.com/file.asp?ObjectID=5401, 2 pages.
PayPal.com Case Study; http://fox.rollins.edu/~slackman/PayPal.htm, 2003, 7 pages.
PayPal-News; http://www.ndrys.com/paypal.html, 2003, 3 pages.
PaySys—company overview, 2 pages.
Picture of Bill payment form or advertisement, 1 page.
Plotkin, Hal; "Beam Me up Some Cash"; 1999, Silicon Valley Insider, 3 pages.
Press Release: "Western Union Announces ATM Card Payout for Money Transfer Transactions"; 2001, URL: http://news.firstdata.com/media/ReleaseDetail.cfm?ReleaseID=849995>.
Products and Services for PaySys, 2 pages.
Quick Cash: A safe and reliable way to send funds around the world; http://www.payment-solutions.com/quickcash.html, 1 page.
Remittance for order sent via Western Union; 1933, 2 pages.
Shopping Order by Western Union, 1933, 1 page.
Shopping Order service and gift service; 1934, Western Union Telegraph Company, Money Order Book, 6 pages.
State of New York Banking Department: Staff Letters and Memoranda; 2000, http://www.banking.state.ny.us/lo000718.htm, 2 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Stockel, Anna; "Securing Data and Financial Transactions"; 1995, Institute of Electrical and Electronics Engineers 29th Annual Conference, pp. 397-401.
Survey of services; 1960, pp. 2-31.
Transfers require ID made by telephaph; 1895, Tariff Book, 4 pages.
Transpoint, "The Way to Pay Online," downloaded from website http://www.transpoint.com/ on Feb. 10, 2000, 12 pages.
VisionPLUS Consumer Payment Solution Overview, 2 pages.
Wermer, Sandra; "A million credit card transactions in five hours"; 1997, Primeur, 2 pages.
Western Union Credit Card; 1915, 4 pages.
Western Union Domestic Transfer Order, Form 72-A, 1933, 1 page.
Western Union Foreign Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Western Union Hotel-Motel Reservation Service, 1 page.
Western Union Money Transfer, Form 72-A, 1933, 1 page.
Western Union New Supplement: Money Orders delivery through Mailgram: 1975, 2 pages.
Western Union News Supplement: Automatic travelers checks using Western Union; 1975, 2 pages.
Western Union Quick Collect: The Fastest way to collect good funds; 1999, 11 pages.
Western Union Shopping Order, 1933, 2 pages.
Western Union Telegraph Company; 1933, Money Order Message.
Wijnen, Rene; You've Got Money!; 2000, Bank Technology News, vol. 13, No. 6, 4 pages.
x.com, Do More with Your Money, downloaded from website http://www.x.com., Feb. 7, 2000, 5 pages.

\* cited by examiner

STAGED TRANSACTIONS SYSTEMS AND METHODS

CROSS-REFERENCES TO RELATED APPLICATIONS

This application is a continuation of U.S. patent application Ser. No. 10/444,111 filed May 21, 2003, which is a continuation-in-part of U.S. application Ser. No. 10/112,258, filed Mar. 29, 2002, which in turn is a continuation-in-part of U.S. Ser. No. 10/007,701, filed Dec. 10, 2001, which in turn is a continuation-in-part of U.S. application Ser. No. 09/823,697, filed Mar. 31, 2001, and U.S. application Ser. No. 09/990,702, filed Nov. 9, 2001, the complete disclosures of which are all incorporated herein by reference.

BACKGROUND OF THE INVENTION

The present invention relates generally to financial transaction systems and methodologies, and in particular to methods and systems for making payments and consummating staged transactions based on a consumer or transaction identification.

A wide variety of payment methods are available to consumers of goods and services. In addition to currency, consumers are often able to use their credit in making purchases. A common system for making credit purchases involves the use of a credit card provided by a credit card issuer, such as a commercial bank or other financial institution. Non-credit transactions can be handled by debit cards, which utilize funds already deposited by the consumer for payment purposes.

Many types of payment methodologies are dependent upon consumers having relationships with financial institutions such as banks, credit unions, etc. However, a substantial percentage of consumers do not use such conventional financial institutions. These consumers are often referred to as "unbanked" because they do not maintain accounts with such institutions. Unbanked consumers are often inconvenienced in making financial transactions. For example, without bank accounts, they experience difficulty and inconvenience in obtaining negotiable instruments, making purchases on credit, etc.

Other consumers may not feel comfortable providing or sending personal information, such as credit card numbers, over the telephone or internet. Such consumers may desire an alternative method of rendering payment. Still other consumers may have had an attempted payment denied, such as by attempting to render payment using a credit card that is at or over the maximum limit available to the consumer, or the like. To assist consumers in these situations, as well as others, an alternative payment scheme(s) may be desired.

Recently there have been a variety of new products which provide at least partial solutions to the problems of the unbanked and other consumers. For example, "prepay" cards allow consumers to pre-purchase various goods and services. An important example relates to the use of telecommunications services, which are available through prepaid "calling cards." Many consumers prepay on a monthly basis for "dial tone" service. Prepaid cards can also be reloadable whereby additional value can be added by consumers for using their cards indefinitely. Another system involves the use of a service provider making payments on behalf of consumers over the Internet global computer network or by negotiable instrument. While these solutions address some of the needs of the unbanked, there remain other needs that have not been addressed.

Therefore, there is a need in the art for solutions to address problems incurred by the unbanked and other consumers. Hence, among a number of other advantages apparent from the following description, the present invention provides systems and methods for addressing such problems.

BRIEF SUMMARY OF THE INVENTION

The present invention provides systems and methods for accepting payments for goods and services provided by a goods or service provider. The methods can include associating consumers and merchants with a payment provider. The payment provider can receive payments destined for the merchant, associate the payments with one or more identifiers, and transfer at least portions of the received payments to the merchant. Further, the present invention provides systems and methods for enrolling consumers in such payment acceptance systems. The present invention still further includes systems and methods for staging transactions initiated by a merchant, a consumer, a beneficiary, or another third party.

The systems can include a point-of-sale device configured to accept payments from consumers on behalf of merchants. In some cases, the systems include a plurality of such point-of-sale devices in communication with a payment provider control. The payment provider control can be in communication with one or more merchant controls. Using such systems, a consumer can enroll to make payments via a payment provider and make payments via the payment provider by accessing any of a number of point-of-sale devices associated with the payment provider control. The consumer alternatively may be able to enroll through the merchant or other third party.

In one embodiment of the present invention, a method for accepting payments from a consumer for a good or service provided by a merchant comprises receiving a transaction request from the merchant, receiving a payment from the consumer, associating the payment with the transaction request, and sending at least a portion of the payment to the merchant. In this manner, the merchant stages the transaction, and the consumer completes the transaction by making the payment. In one aspect, method is performed by a payment provider system. In another aspect, the method is performed by a point of service (POS) device. In still another aspect, the method is performed partly by the payment provider system and partly by the POS device.

In one aspect, the method includes storing a record of the payment and the associated transaction request in a database. Typically, the merchant desires to know when payment has been made prior to rendering the service or shipping the goods. Hence, in one aspect, the method includes receiving an inquiry from the merchant as to whether the payment was made by the consumer, and sending a reply to the merchant in response to the inquiry. Alternatively, the method includes providing an indication to the merchant that the payment was made by the consumer. This may occur, for example, prior to being prompted by the merchant. The method further may include electronically sending at least a portion of the payment to an account of the merchant. Another portion of the payment may include a fee or surcharge for the staged transaction service.

The transaction request may take a variety of forms within the scope of the present invention. For example, in one aspect the transaction request includes a consumer profile. In this embodiment, the method may further include verifying a consumer identify against the consumer profile. Alternatively, the consumer may remain anonymous. In another aspect, the transaction request includes a time limit. In this embodiment, the payment may be accepted if received within the time limit, and optionally rejected if not received within the time limit. If the payment is rejected, in one embodiment the rejection is reported to the merchant to help ensure the service or goods are not provided to the customer. The transaction request also may include a short or detailed description of the good(s) and/or service(s) to be provided the consumer. The transaction request also includes, in some embodiments, the amount to be paid by the consumer.

In one aspect, the method includes providing the merchant with a transaction identifier that corresponds to the transaction request. The method may further include receiving the payment if the customer provides the transaction identifier that corresponds to the transaction request. The transaction identifier may include, in one embodiment, an alpha-numeric string of characters.

In some embodiments, it may be desirable to provide the customer with a confirmation that payment has been made. This confirmation may take many forms, including a confirmation number and/or a printed receipt. In one aspect, the confirmation includes a certificate. The certificate may comprise a wide range of certificates, including a gift certificate, an electronic ticket such as for use with a transportation company, an award, a redeemable coupon, and the like. Thus, in some embodiments, the good(s) and/or service(s) is rendered upon payment.

In still other embodiments, the processor of the payment transfer, such as the payment provider, may guarantee the finds. This may be useful, for example, when the goods or services are to be provided to the consumer upon the consumer rendering payment to the payment provider, but prior to transfer of the funds from the payment provider to the merchant. Other uses and reasons for guaranteed funds also fall within the scope of the present invention.

The present invention further includes systems for receiving payments from consumers. In one embodiment, the system includes a processor and a storage medium, with the storage medium having instructions executable by the processor to perform some or all of the described methods. In a particular embodiment, the storage medium contains executable instructions to receive a transaction request from the merchant, receive a payment entry from the consumer, associate the payment entry with the transaction request, and send at least a portion of the payment to the merchant.

In one aspect, the storage medium further includes instructions executable by the processor to compare a payment time limit to a time of the payment entry, and reporting a result to the merchant. The system may further include a printer adapted for printing a confirmation of the payment entry. In another aspect, the storage medium includes executable instructions to provide a first transaction identifier to the merchant, and wherein the receive payment process further comprises receiving the first transaction identifier.

In one embodiment, the processor and storage medium are included in a payment provider. This system further includes, in one aspect, a POS device coupled to the payment provider and adapted to transmit the transaction request to the payment provider. In another aspect, the payment provider includes a payment system having a database, and wherein the payment system is configured to permit the transaction request to be input and processed, and to send a transaction identifier to the merchant upon receipt of the transaction request.

In alternative embodiments, the transactions are requested and/or staged by the consumer. In this manner, the consumer can initiate a transaction with a merchant. In still other embodiments, a designated recipient is identified to receive either the goods, the services, and or the payment. In this manner, the transaction may be staged for the benefit of a number of entities or individuals, including the consumer.

In one embodiment, a method for accepting payments include receiving a transaction request, reporting the transaction request, and associating a transaction identifier with the transaction request. The method includes receiving a payment associated with the transaction identifier, and reporting the payment. In one embodiment, the payments are accepted on behalf of a merchant. In this embodiment, the transaction request and the payment are reported to the merchant. In some aspects, the "merchant" is an individual, such as an individual who is to receive funds through a staged transaction. In other aspects, the transaction request is received from a third party, from a beneficiary of the transaction, or the like. In still another aspect, the payment is received from a third party.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Various detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure.

Among other things, the present invention provides systems and methods for accepting payments for goods and/or services offered by a third party provider. In some embodiments, the present invention provides systems and methods for enrolling consumers in goods and/or services provided by a third party provider. As further discussed below, such third party providers of goods and/or services are referred to herein as "merchants" and those accepting payments and providing enrollment services are referred to as "payment providers."

Figure 1A:
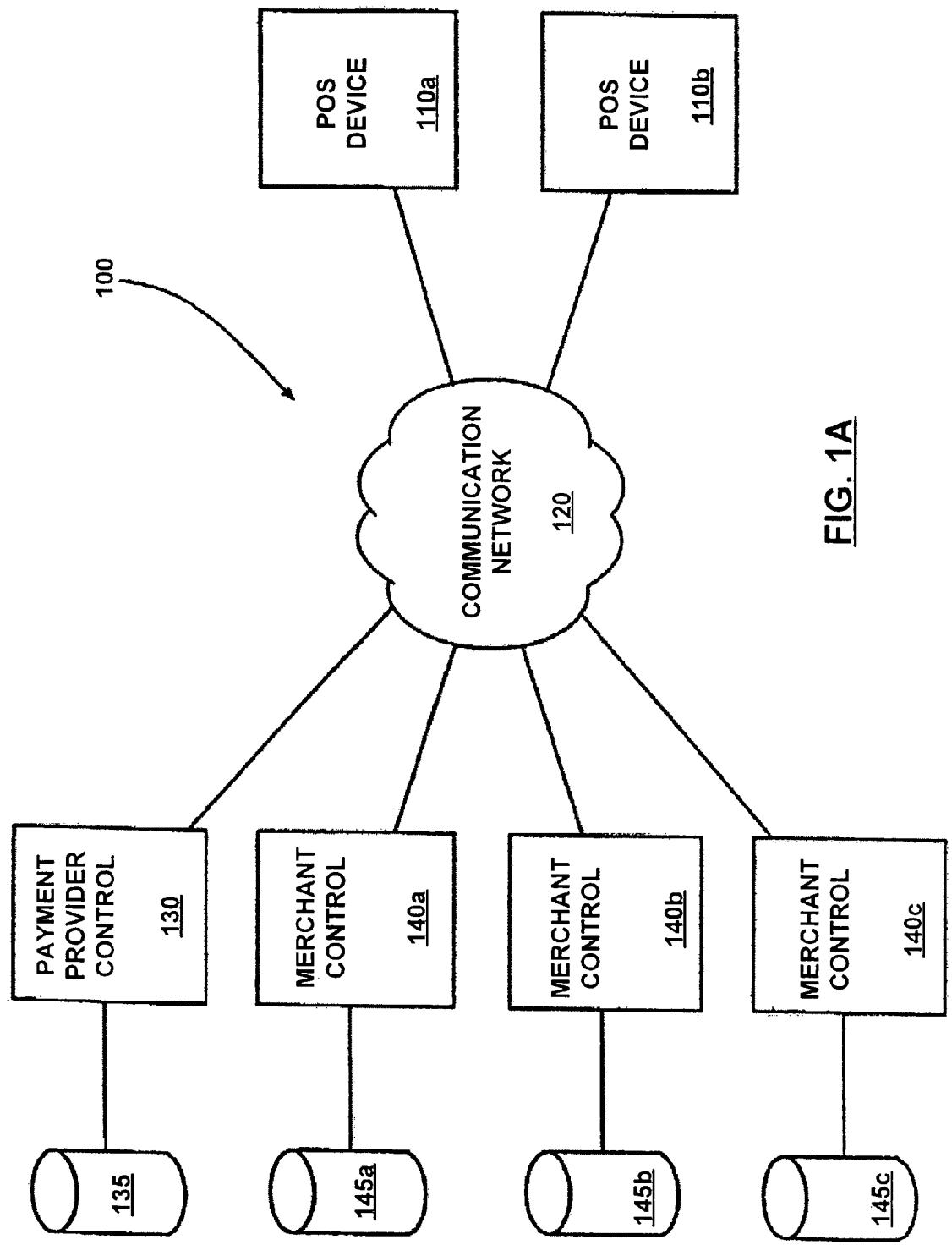
FIGS. 1A-1B are schematic diagrams of payment service and/or enrollment systems in accordance with embodiments of the present invention.

Referring to FIG. 1A, an enrollment and payment system 100 is illustrated that may be used to facilitate payments made to purchase goods or services, and/or provide enrollment services in accordance with an embodiment of the present invention. System 100 includes a point-of-sale ("POS") device 110 in communication with a payment provider control 130 via a communication network 120. In addition, payment provider control 130 is communicably coupled to one or more merchant controls 140 via communication network 120. Payment provider control 130 is associated with a payment provider database 135 and merchant controls 140 are associated with merchant databases 145. As will be evident from the proceeding discussion, system 100 can include any number of POS devices 110 and merchant controls 140 in accordance with the various embodiments of the present invention.

POS device 110 can be any device disposed at the point-of-sale. Thus, POS device 110 can be one such as is described in copending U.S. patent application Ser. No. 09/634,901, entitled "POINT OF SALE PAYMENT SYSTEM," filed Aug. 9, 2000 and U.S. Prov. Appl. No. 60/147,899, entitled "INTEGRATED POINT OF SALE DEVICE," filed Aug. 9, 1999, both of which are incorporated herein by reference for all purposes. Based on the description provided herein, one of ordinary skill in the art will recognize other devices capable of operating as POS device 110. For example, POS device 110 can be a personal computer ("PC"), a personal digital assistant ("PDA"), other wired or wireless devices, and the like.

As used herein, a merchant is any individual, group of individuals, or entity that offers or has provided goods and/or services to consumers. Further, such merchants may use merchant controls 140 to maintain accounts and other information related to the consumers that they serve. Such merchant controls 140 can be any type of computer capable of communicating with other types of communication devices or computers. For example, merchant control 140 can be a mainframe computer, such as those available from Tandem, a server computer, a personal computer, a PDA, other wired or wireless devices, hand held devices, and the like.

In some cases, merchants are incapable of, or choose not to accept payments directly from consumers, or a particular group of consumers. These payments may be fixed payments, or variable payments, within the scope of the present invention. Thus, in some instances, a merchant may desire to outsource payment services to a payment provider. Alternatively, a merchant may accept payments from consumers with good credit, while it may desire to outsource payment acceptance for consumers with poor credit to a payment provider. As yet another alternative, a merchant may accept non-cash payments directly, while deferring cash collections to be handled via a payment provider. Some examples of merchants include, but are not limited to, a phone company, an electric company, a credit card company, a televised shopping network, an airline or other transportation company, a retail store, and the like.

In other cases, the merchant is an individual. For example, the individual-merchant may be a seller using an on-line auction web site to sell an item, or a large number of items. In this embodiment, the consumer is a buyer or "high bidder" that may be directed to a payment location near them to facilitate rapid payment. Other examples involving an individual as a merchant also exist within the scope of the present invention, including individuals selling item(s) or product(s) via on-line or print classified advertisements, or the like.

Thus, for whatever reason, a merchant may choose to utilize a payment provider to collect payments and/or enroll consumers on its behalf. Thus, as used herein, a payment provider is any entity that is capable of accepting payments from consumers and/or enrolling consumers, and crediting the accepted payments to the appropriate merchant. In some cases, a payment provider is an entity that provides both POS device 110 and payment provider control 130. In other cases, a payment provider is an entity that provides payment provider control 130, and accepts inputs from POS devices 110 operated by third parties. In yet other cases, a payment provider is an entity that provides POS device 110 that interacts directly with merchant controls 140 without utilizing payment provider control 130. Further, in some cases a payment provider can also be an enrollment provider, where the payment provider not only accepts payments destined for the merchant, but also enrolls consumers in the goods and/or services of the merchant. In yet other instances, a payment provider can provide only enrollment and not payment acceptance services.

In some embodiments of the present invention, merchants 140 issue unique identifiers which are associated with a good or service that are electronically transmitted to payment provider 130, where they can be stored in database 135. These identifiers may be associated with specific consumers. For example, when requesting a good or service, the merchant may create an account, an identifier is then associated with the account and issued to the consumer. Alternatively, the identifiers may be associated with a good or service, but not to any given consumer. For example, the identifiers may be associated with some type of stored value, such as phone time, dollars and the like. This value may be redeemed simply by presenting the identifier to the merchant. The identifiers also may be associated with a particular transaction of goods or services between a merchant, and a specific consumer as further detailed below.

Communication network 120 can be any network capable of transmitting and receiving information in relation to POS device 110, merchant controls 140, and payment provider controls 130. For example, communication network 120 can comprise a TCP/IP compliant virtual private network ("VPN"), the Internet, a local area network ("LAN"), a wide area network ("WAN"), a telephone network, a cellular telephone network, an optical network, a wireless network, or any other similar communication network.

In some embodiments, communication network 120 is a combination of a variety of network types. For example, in one embodiment, communication network comprises the Internet for communicating between POS device 110 and payment provider control 130, and a dial-up network for communicating between payment provider control 130 and merchant controls 140. In light of this document, one of ordinary skill in the art will recognize a number of other network types and/or combinations thereof that are capable of facilitating communications between the various components of system 100.

Figure 1B:
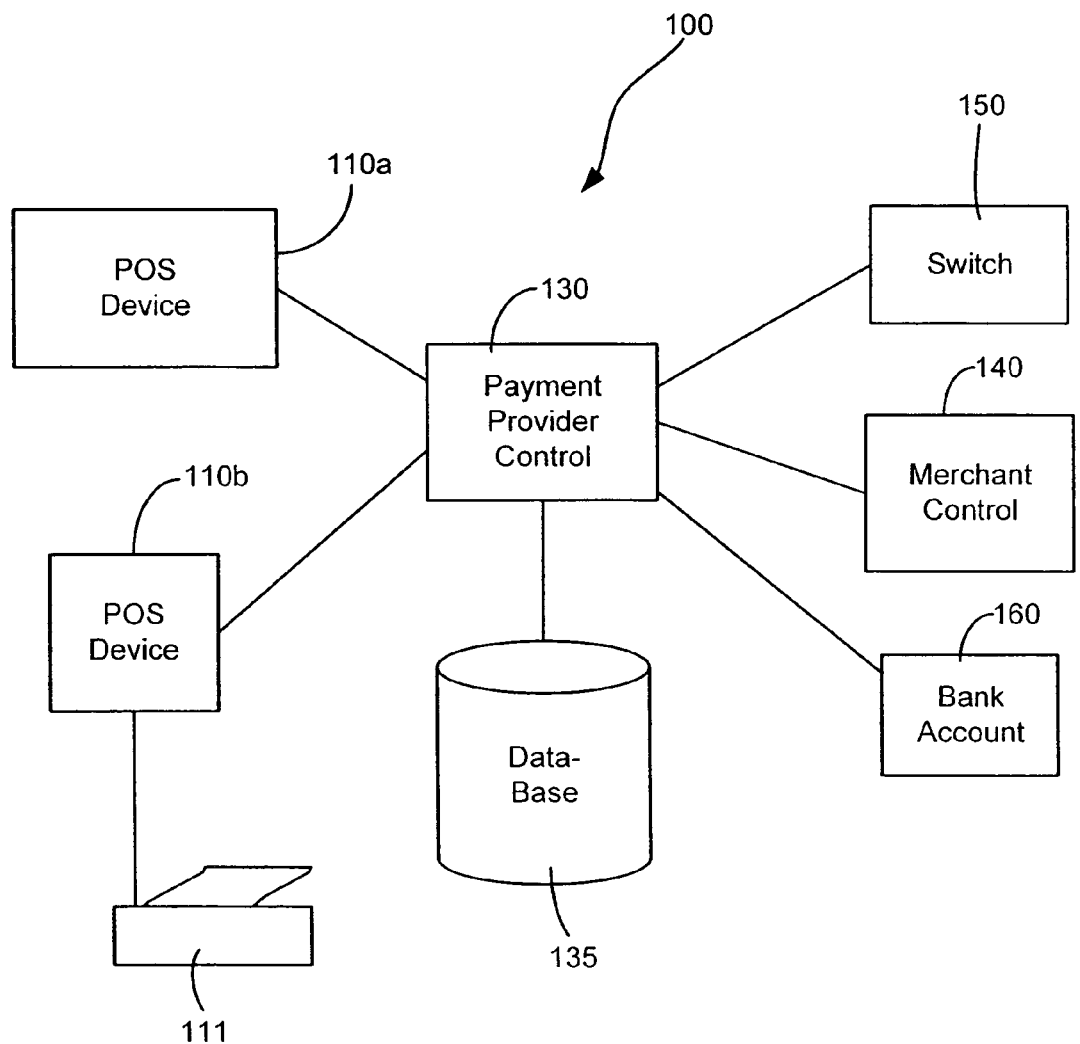

Referring to FIG. 1B, a logical-diagram of system 100 of FIG. 1A is illustrated. Central to system 100 is payment provider control 130. In particular embodiments, payment provider control 130 is comprised of a host computer capable of accessing one or more databases 135. Further, payment provider control 130 facilitates data transfer between one or more merchants 140 and one or more POS devices 110, or other computer terminals.

Payment provider control 130 can be any type of computer capable of communicating with other types of communication devices or computers. For example, payment provider 130 can be a mainframe computer, such as those available from Tandem, a server computer, or the like.

POS devices 110 communicate with payment provider control 130 in order to facilitate transactions. For example, when ready to make a payment, a consumer may enter their consumer identifier or a transaction identifier into POS device 110. This information is transmitted to payment provider control 130 where any relevant information regarding the required payment is transmitted back to POS device 110. For instance, POS devices 110 may present a screen with the identifier and the amount of payment required to receive a good or service from merchant 140. In some cases, the consumer may not yet have an identifier and may simply request to purchase a good or service from a merchant 140. For instance, the consumer may wish to purchase phone time from a certain phone company. In such cases, the consumer makes a request to purchase phone time from a certain merchant 140. This information is entered into POS device 10. POS device 110 may then display payment options for that provider as received from payment provider control 130. For example, payment in increments of $5, $10, $25 and $50 may be accepted. Upon receipt of payment, an identifier is issued to the consumer. Conveniently, a printer 110 may print a receipt with the identifier.

At the time of payment, other funds may also be collected. For example, the payment provider may charge and collect a fee for its services. As another example, applicable taxes may be calculated and collected. These taxes may be calculated by payment provider control 130 in combination with database 135 and may include tax tables for various locations throughout the country. When tendering payment, the consumer may provide information on his residential address, such as a zip code. This information is transmitted to payment provider control 130 that performs a look-up in database 135 to determine the appropriate tax rate. Payment provider control 130 then computes the tax and sends the tax information to POS 110. The payment amount, taxes, and any service fees may then be displayed to the consumer on a display screen. Alternatively, the taxes may be computed directly by POS device 110 and based on the location of POS device 110, or in part by POS device 110 and in part by payment provider control 130.

Upon tendering payment, an electronic record of the payment along with the associated identifier is transmitted to payment provider control 130 where it may be stored in database 135. This payment information may also be transmitted to merchant control 140 so that the good or service may be provided to the consumer. If the services relate to telecommunications or other utilities, the payment information may also be sent from payment provider control 130 to a switch 150 to permit the communications service or utility to be promptly provided. For example, if the consumer purchased cell phone time, the merchant's switch would receive the payment information and add time to the phone, typically before the consumer leaves the location where payment is made. Of course, the instructions to the switch could also be sent from the merchant as well. Receipt of payment information may also trigger the providing of other services, such as service activation, shipping of order goods, and the like. In some cases, the service may not be activated or the ordered good not provided until the consumer contacts the merchant and gives the issued identifier. For example, phone time may be purchased, but not activated until the phone company is contacted and given the identifier. When the good is a stored value, this record may be stored in database 135 and transmitted to merchant control 140. When a good or service is ordered from a merchant, the identifier is presented to the merchant control 140 associated with the merchant and the stored value account is debited for the purchase price.

In another embodiment, the merchant or other third party initiates the transaction with the consumer. The merchant may obtain some or all required information from the consumer, and input that information into a POS device 110 linked to payment provider control 130. The merchant may also input information on the goods or services to be provided, and obtain a transaction identifier to provide to the customer. The customer contacts the payment provider control 130 to effectuate payment. Payment may occur in a variety of ways, including without limitation, by cash, check, credit card, stored value card or account, money order, ACH, and the like. The merchant then ships or otherwise provides the goods or services when notified that the consumer has paid. The merchant may be notified, for example, by payment provider control 130.

Payment provider control 130 may also be used to electronically transfer the payment along with any collected taxes to the merchant. This may conveniently occur by an ACH transfer of funds into a bank account 160 of the merchant. This may occur upon receipt of the payment information by payment provider control 130 or by batch mode at specified times. A record of the deposit may separately be transmitted to merchant control 140. Payment provider control 130 is configured to communicate with a separate ACH system that debits the account of the consumer and credits the account of the merchant as is known in the art.

In some embodiments, payment provider control 130 maintains credit information about consumers, or has the ability to access such credit information from other sources including, but not limited to, merchant control 140. Thus, for example, a particular consumer may have very poor credit or no credit, in which case the merchant may require full payment prior to supplying the good or service.

Hence, system 100 provides consumers with an easy way to purchase goods or services. Further, such goods and services are provided in an efficient manner and provides rapid payment to the merchant. Another feature of system 100 is that the merchant may also be provided with access to payment provider control 130. In this way, the merchant may do a look-up to see if a payment was posted correctly, to see the status of a payment or the like. Further, regular updates may be sent from merchant control 140 to payment provider control 130 so that consumer accounts may be kept current.

In yet other instances, system 100 can be used to enroll consumers in products and/or services offered by one or more merchants. In such a situation, POS device 110 can display product offerings associated with one or more merchants. Such information can be obtained from payment provider control 130. Further, POS device 110 can gather enrollment information and payments for enrollment, and based on information provided by payment provider control 130, can provide consumers with activated accounts for goods and services provided from a particular merchant. These and other features of system 100 are discussed in greater detail below.

Figure 2:
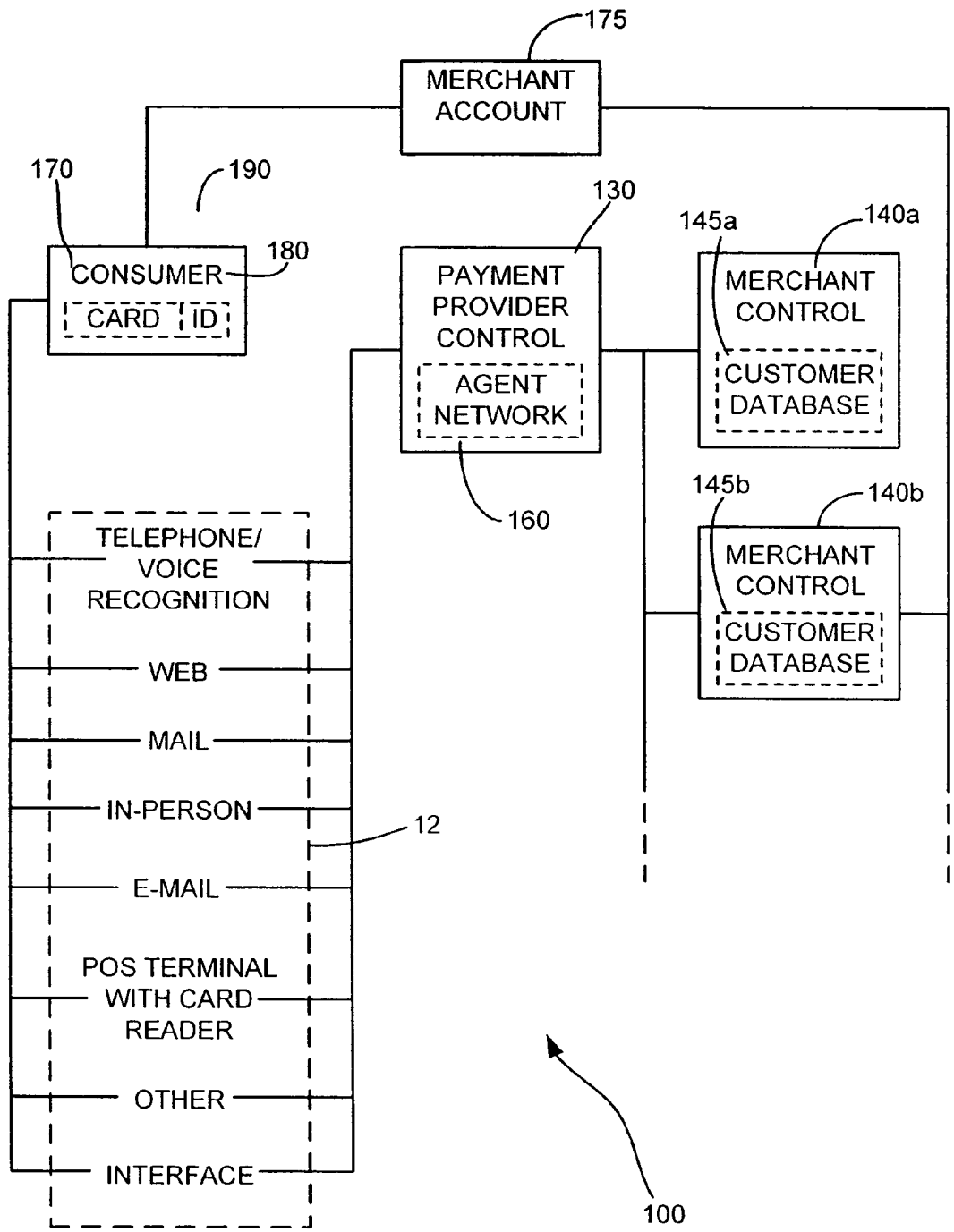
FIG. 2 is a logical diagram of a payment service and/or enrollment system similar to the systems illustrated in FIG. 1.

Referring to FIG. 2, another embodiment of system 100 is illustrated including discussion of additional elements. As shown, system 100 includes payment provider control 130 for facilitating payment from a consumer 190 to one or more merchants represented by merchant controls 140.

Each consumer 190 has a unique identifier or ID 180, which can comprise any suitable identifier. Conventional identifiers such as name, social security number, PIN, etc. are acceptable. Moreover, system 100 can accommodate anonymous consumers 190. Such consumers 190 can maintain their anonymity by creating their own IDs 180. ID 180 can also comprise the consumer's telephone number. Thus, system 100 can be used for paying for telephone services using only the telephone number of consumer 190 for identification purposes. Consumer 190 in this embodiment does not even have to provide an address or any other personal information. Similar identification arrangements could be used with other merchants (e.g., accepting payments on accounts with the consumers identified by their respective account numbers). Consumer 190 interfaces with payment provider control. 130 through an interface 12. Interface 12 can comprise any suitable form or device for communications, including telephone (which can incorporate voice recognition (VR)), worldwide web (Internet), mail, in person, a point-of-sale (POS) terminal with a card reader, e-mail or any other suitable interface. As with the previous embodiments, interface 12 can be a POS device 110. Further, in some embodiments, POS device 110 can be installed at a retail outlet unrelated to any of various merchant controls 140 and/or payment provider controls 130 accessible via system 100.

In this particular embodiment, payment provider control 130 includes an agent network 160, where agents in the network provide POS devices 110 at locations accessible to consumer 190. Payment provider control 130 maintains merchant accounts 175 which can correspond to the various merchants represented by merchant controls 140. Each merchant control 140 can have associated therewith a database 145 containing pertinent information regarding the consumers 190 and their respective accounts. The designation of accounts, sub-accounts, master accounts, etc. can vary from merchant to merchant. Thus, as used herein the terms account, sub-account and similar terms can designate either the entire account base of a particular merchant control 140, or the individual account of consumer(s) 190.

In one embodiment, agent network 160 comprises a host computer (not shown) that may be accessed by a variety of remote computers or other devices, such as those described in connection with interface 12. For example, the host computer may comprise a mainframe computer, a server computer, or the like. A database may also be associated with the host computer. In this way, information from consumer databases 145 may be transmitted to the host computer and stored in the database. When a consumer 190 contacts agent network 160, it may be through the host computer. Hence, with this configuration, a consumer may proceed with a transaction using interface 12 which contacts the host computer of agent network 160 to receive consumer information, such as the unique identifier, and to transmit payment information back to the host computer. The host computer may also serve to coordinate a wire transfer of the payment to a bank account of the merchant as well as to transmit payment information to merchant control 140. Electronic funds transfers may conveniently be made through an automated clearing house (ACH) system that is contacted by the host computer. ACH transfers are well known within the art and will not be described further.

It should be recognized that in some embodiments, a card 170 can be issued to consumer 190 and include various information relevant to consumer transactions. Card 170 can be used to facilitate payments via POS device 110. More particularly, card 170 can include a magnetic stripe that can be swiped through a card reader associated with POS device 110 and used to identify consumer 190 to system 100. Either alternatively or in addition, card 170 can comprise a reloadable/stored value card, a credit card, a debit card, or the like. Thus, any suitable card configuration can be utilized. For example, preprinted cards with concealed consumer IDs 180 can be inventoried with the agent network 160 for distribution upon enrollment of consumers 190. However, system 100 can function without any cards whatsoever. In such embodiments, system 100 can function by assigning unique consumer IDs 180 for purposes of conducting all payment transactions.

In some embodiments of the present invention, consumers are enrolled to purchase goods and/or services offered by a merchant. Such a service can include purchase of a money order, payment of a utility bill, effectuating a money transfer, payment for a good or service offered by the merchant, or the like.

With the consumer interacting with POS device 110, it is predictively determined what type of goods and/or services to market to the consumer. Such a predictive determination can include identifying goods or services related to the transaction previously performed using POS device 110. For example, the consumer may be purchasing a cell phone, in which case POS device 110 can advertise a cell phone charger to the consumer or cell phone service offered by one or more merchants. As another example, where a consumer is setting up service with an electric company, POS device 110 can surmise that the consumer recently moved. In such a circumstance POS device 110 may advertise other services useful to a person that recently moved. For example, POS device 110 can advertise voter registration, enrollment with other utility companies, applications for a driver's license, new license plates, and other similar goods and services.

Alternatively, or in addition, POS device 110 and/or payment provider control 130 may maintain a historical record of transactions performed in relation to a particular consumer. This historical information can be analyzed to determine which goods or services that the consumer would be most likely receptive. Further, the information can be analyzed to determine goods and services for which the consumer is qualified. For example, it may be determined that a consumer consistently purchases a good that is offered in a larger quantity directly from a merchant at a reduced price. One of ordinary skill in the art will appreciate a number of other analysis that may be used to predict goods or services to be marketed to a particular consumer.

Where a request to enroll in a particular good or service is received, POS device 110 displays a request to the consumer for required enrollment information. Such enrollment information can be similar and gathered in similar fashion to that discussed in the preceding embodiment. As an example, such enrollment information can include the name, address, and telephone number of a consumer desiring to set up an account with an electric company. It will be appreciated that any level of information can be requested depending upon the type of goods or services requested.

Some embodiments of the methods include an additional step of creating a client database. Such a client database can be the database used by a particular merchant to account for services and/or products provided in relation to consumers. Further, such a database can include identifiers unique to each of the consumers within the database as well as account balances and credit histories of each of the consumers. Such a database can be formatted for transfer to payment provider control 130. By transferring at least a portion of the information on the database to payment provider control 130, consumers in the merchant's database can automatically be enrolled with the payment provider. The consumers can also be notified of the enrollment and directed to the nearest payment provider location(s) at which they can make payments. Additional details on enrollment methods and systems are provided in U.S. patent application Ser. No. 10/112,258, the complete disclosure of which has been previously incorporated herein by reference.

FIGS. 3-8 illustrate a variety of methods in accordance with the present invention and to which embodiments of system 100 can be applied. Turning to FIGS. 3A-3B, embodiments of the present invention can be used, either additionally or exclusively, to accept and process payments in relation to various goods and services provided by merchants. Referring to FIG. 3A, a flow diagram 300 illustrates one method of accepting payments in accordance with the present invention. Following flow diagram 300, information about the consumer desiring to make a payment is input to POS device 110 (block 302). Such information can be very minimal, such as, an auction number and payment amount where the consumer desires to remain anonymous. Alternatively, the information can be an identifier previously provided by the merchant to identify payments made by the consumer. In other situations, the information can be quite extensive including, but not limited to, the consumer's name, address, telephone number and account number for the account of the merchant to which a payment is to be applied. Based on this disclosure, one of ordinary skill in the art will appreciate the information that can be collected from a consumer to make a payment on a particular account.

In some embodiments, the information can be provided to POS device 110 automatically. For example, the information can be entered using a magnetic stripe card reader associated with POS device 110. Alternatively, a small amount of information about the consumer can be entered via a keyboard associated with POS device 130 and the remainder of the information about the consumer automatically populated from database 135 via payment provider 130.

Once the consumer information has been provided, the information is used to identify and verify the consumer (block 304). In some embodiments, this includes displaying the received information via a display associated with POS device 110. The consumer is then expected to review the information for accuracy, and press a key indicating that the information is complete. In other embodiments, identifying and verifying the consumer includes accessing payment provider control 130, and comparing the identification information received from the consumer against information maintained on database 135. The information maintained on database 135 can include account balances for the consumer related to one or more merchants, as well as other information.

In one particular embodiment, the consumer is identified and in addition provides a merchant identification via POS device 110. This information is transferred to payment provider control 130 via network 120. Payment provider control 130 accesses the account information associated with the consumer and transfers the account information to POS device 110 where it is displayed to the consumer via a display and/or a printed receipt. Thus, in some embodiments, it is possible for a consumer to obtain account information related to one or more merchants from a payment provider.

After the consumer is identified and verified, the consumer tenders payment to the payment provider (block 306). This can be done by handing cash to a merchant operating POS device 110, by swiping a credit card through a magnetic stripe card reader associated with POS device 110, by authorizing a bank transfer using POS device 110, or any other method of tendering payment. Once the payment is received, POS device 110 transfers an indication that payment was received and the amount of received payment to payment provider control 130 via network 120. In some embodiments, payment provider control 130 responds via network 120 with an indication that the payment was received. POS device 110 also prints a receipt for the consumer (block 308). The receipt can include a variety of information, such as, the account for which payment was received, the amount of the payment, and even advertisements.

In embodiments where payment provider control 130 maintains information related to the consumer's account, the amount of the received payment is credited to the account. Payment provider control 130 credits the payment to the associated merchant (block 310). This can be done by wire transfer from the payment provider to a bank account associated with the merchant. Other methods may also be used to effectuate such a transfer. In addition, payment provider control 130 provides a notification of payments and associated accounts to merchant control 140 via network 120 (block 312). In turn, merchant control 140 updates the account balance of the consumer from which the payment was received.

In particular embodiments, the processes listed in block 310 are performed sometime after the processes listed in block 312. Thus, for example, a consumer may make a payment, and shortly thereafter the payment is reflected on their account with the merchant. Then, sometime later, the finds associated with the payment are actually transferred to the merchant. In an alternative embodiment, the payment is reflected in the merchant account in real-time, upon the customer making the payment. In another embodiment, the funds transfer to the merchant account occurs in real-time, or through some other physical or electronic means.

As will be appreciated from the foregoing discussion, such an approach to accepting and processing payments provides a number of advantages. As just one of the advantages, an unbanked consumer can make cash payments on an account with a merchant remote from the consumer. Thus, a consumer no longer needs to send cash through the mail. As yet another advantage, a consumer that promises payment but ultimately fails to pay can instead be directed to a payment provider location near them to make the necessary payment. Thus, the aforementioned systems and methods can avoid "the check is in the mail" syndrome or similar broken promises to pay. Further, a consumer that desires to purchase goods, but would like to remain anonymous, can tender a cash payment via the payment provider, and thus avoid being traced by credit card or check information. Such methods also can be used to make multiple payments across multiple merchants. Thus, a consumer need only enter a single transaction to pay a number of bills. Yet further, a consumer that is nearly late in paying can go to a local payment provider, tender payment, and have the payment immediately credited to their account, thus avoiding any late fees. More particularly, a consumer with a credit card bill due the next day can avoid late fees, or the necessity of sending payment via an overnight express service, by using a payment provider where the credit card company is affiliated with and accepts payment via the payment provider. Based on the disclosure herein, one of ordinary skill in the art will recognize a myriad of other advantages associated with the systems and methods disclosed herein.

Figure 3A:
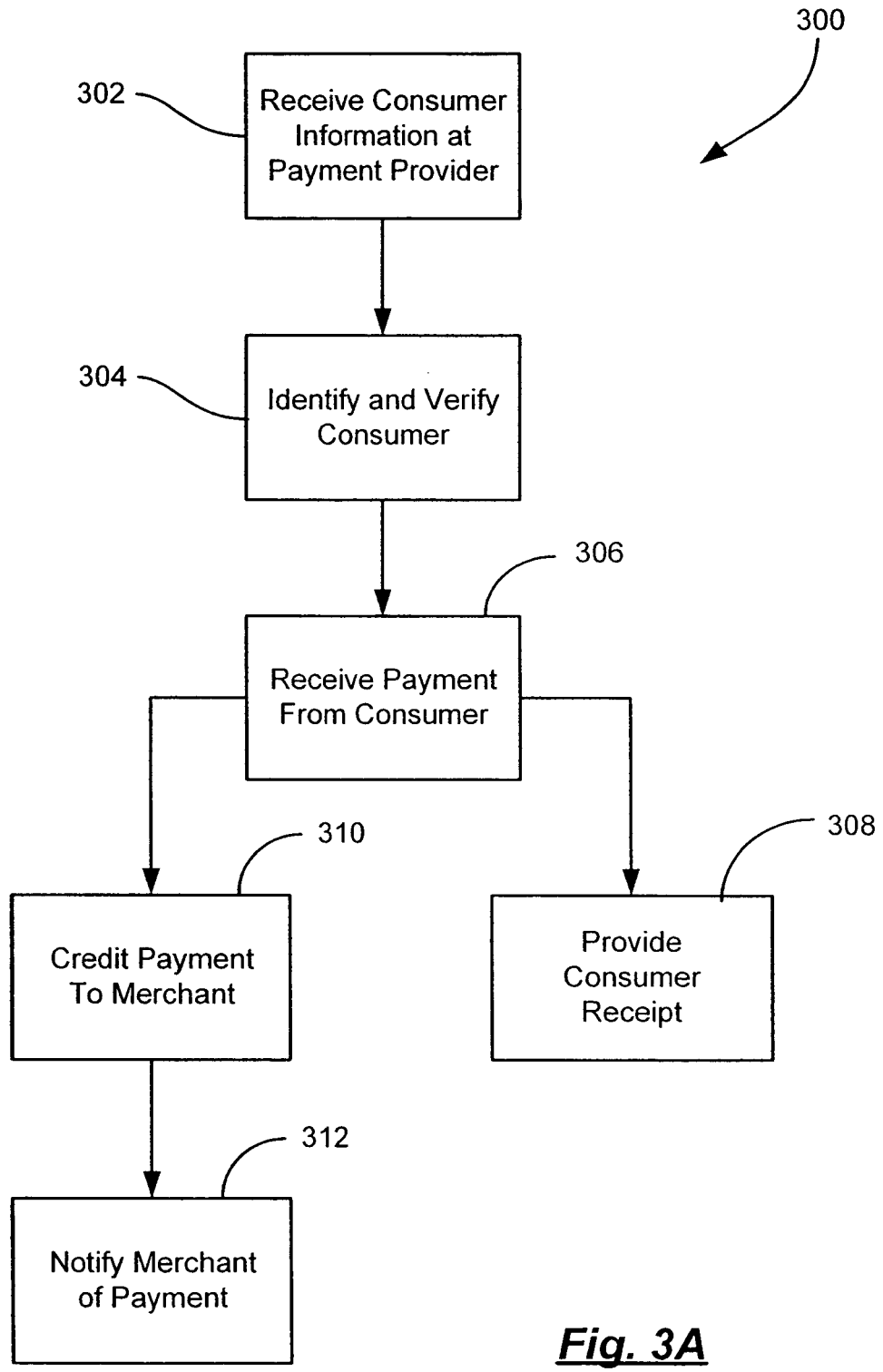
FIGS. 3A-3B are flow diagrams for processing payments in accordance with embodiments of the present invention.
Figure 3B:
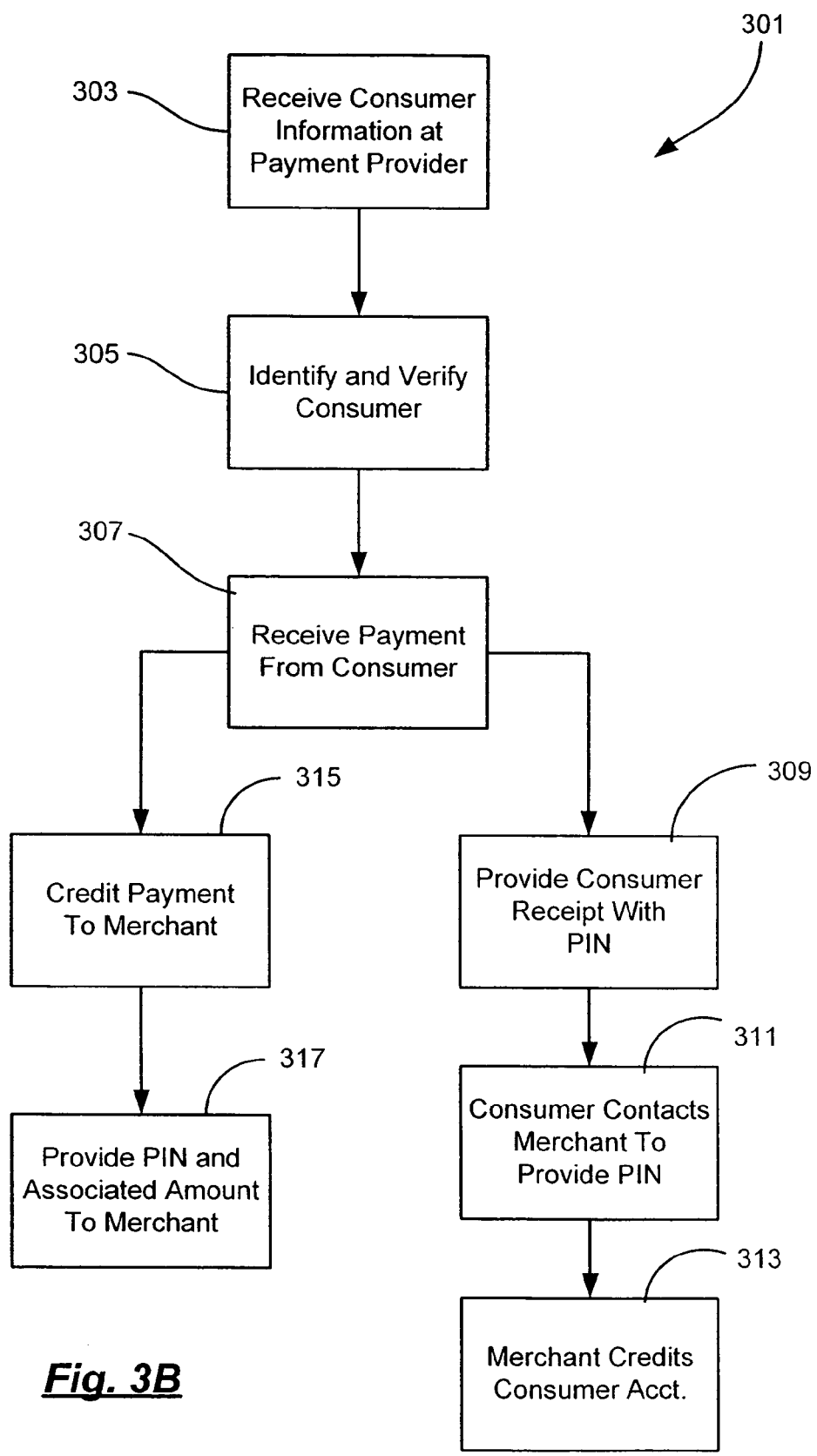

Referring to FIG. 3B, a flow diagram 301 illustrates another method of accepting payments in accordance with the present invention. Following flow diagram 301, information about the consumer desiring to make a payment is input to POS device 110 (block 303). As with the previous embodiment, the information obtained from the consumer depends upon the transaction being completed and can be determined by the merchant and/or the payment provider.

Once the consumer information has been provided, the information is used to identify and verify the consumer (block 305). This identification and verification is similar to that discussed in relation to FIG. 3A. After the consumer is identified and verified, the consumer tenders payment to the payment provider (block 306), again, similar to the manner discussed in relation to FIG. 3A.

Once the payment is received, POS device 110 transfers an indication that payment was received and the amount of received payment to payment provider control 130 via network 120. In some embodiments, payment provider control 130 responds via network 120 with an indication that the payment was received. Payment provider control 130 credits the received payment to the merchant (block 315), and provides an identifier, or PIN, to the consumer (block 317). The PIN is unique to the payment. Thus, a block of fluids can be transferred to the merchants, with portions of the funds being associated with various PINs. In some embodiments, at this point in the method, the merchant is not aware of which consumers the funds are attributable.

POS device 110 also prints a receipt for the consumer (block 309). The receipt can include a variety of information, such as, the account for which payment was received, the amount of the payment, and even advertisements. In particular embodiments, the receipt includes an identification number, or PIN, that is unique to the received payment.

The consumer can then contact the merchant directly and provide the PIN (block 311). With this information, the merchant can verify that the PIN is valid and that a payment was received in association with the PIN. The amount of the payment associated with the PIN can then be credited to the consumer's account (block 313).

Figure 4:
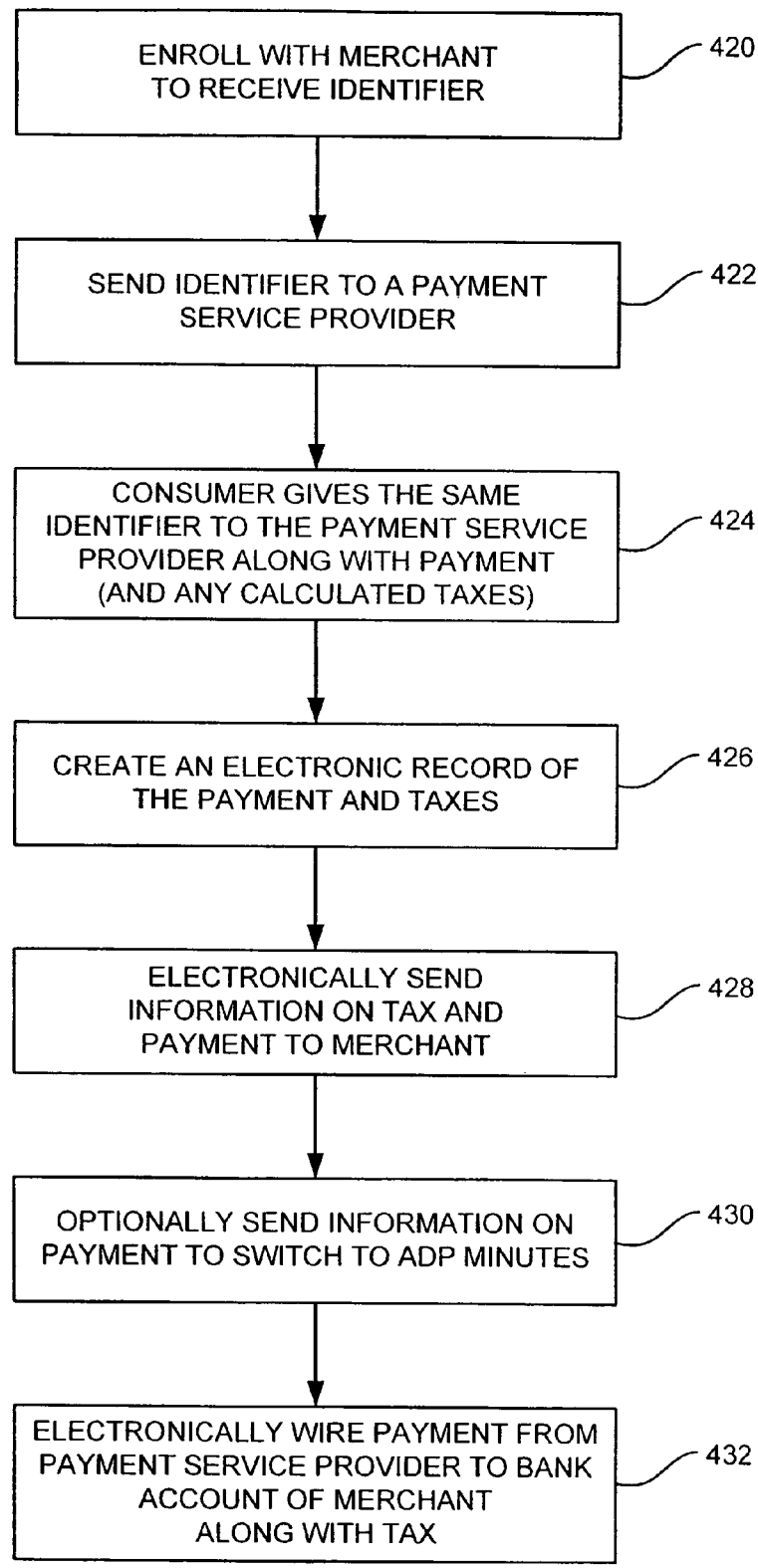
FIG. 4 is a flow diagram illustrating one method in accordance with the present invention for paying for a good or service.
Figure 5:
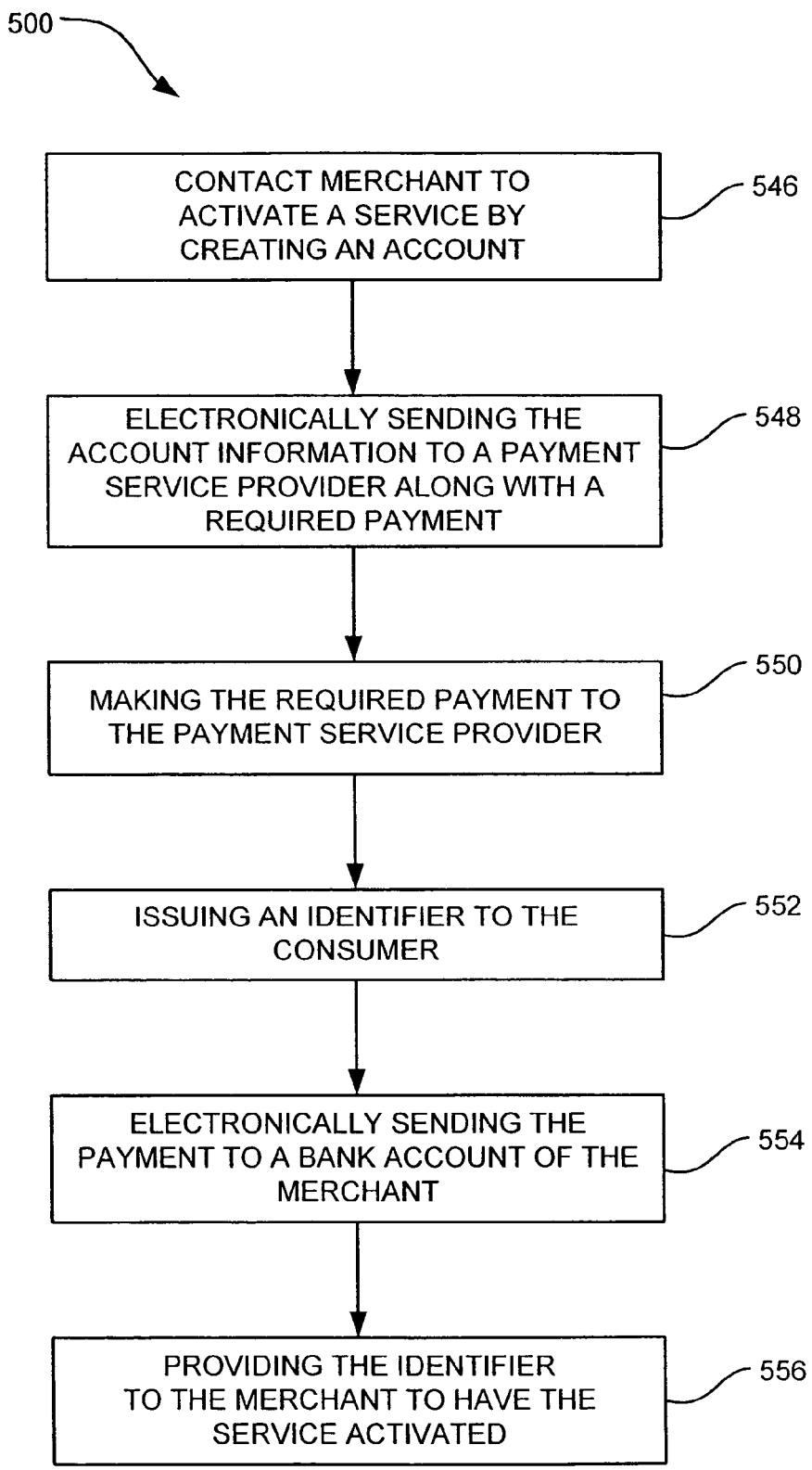
FIG. 5 is a flow diagram illustrating a service activation method according to the invention.

Referring to FIG. 4, a method for pre-paying for a good or service according to the present invention is described in relation to flow diagram 400. As illustrated by flow diagram 400, a consumer enrolls with a merchant to order a good or a service (block 420). For example, services that may be ordered include phone service, including phone minutes, a stored value service, and the like. Goods that may be purchased include essentially any type of good including retail items, clothing, furniture, sporting goods, cosmetics, toiletries, durable goods, vehicles and the like.

When such an enrollment is requested, the merchant creates an electronic account to maintain a record of payments and supplied goods and/or services provided to the consumer. Such an account can be maintained in database 145 of the merchant control 140 associated with the particular merchant. The account may also include a historical record of the consumer's behavior, and any other relevant information. In some instances, an enrollment may only be for one particular purchase, while in other cases an enrollment may be intended for a longer period and anticipate multiple or ongoing purchases.

In addition, a unique identifier is also associated with the account and included in the record to uniquely identify the request. This identifier may be any type of identifier as previously described, including phone numbers, order numbers, credit card numbers, social security numbers and the like. In some instances where only a one-time purchase is to be recorded, the identifier is specific to the single transaction. However, in other instances, the identifier can be intended to designate the consumer in any number of future transactions. In yet other instances, the identifier can designate both the consumer in ongoing transactions and designate a particular transaction. Thus, for example, the identifier may include a portion unique the consumer and reused across multiple transactions, and another portion designating a particular transaction.

The identifier is provided to the consumer along with instructions as to where a payment may be made. The instructions indicate a location of a POS device 110 associated with a payment provider control 130 capable of accepting payments for the particular merchant. In some embodiments, the merchant may access an affiliated payment provider control 130 via its merchant control 140 to request location information for a POS device 110 that is convenient to the consumer. In one particular embodiment, the consumer's address is provided along with the request for location information. Based on this address information, payment provider control 130 identifies the nearest one or several (e.g., five) POS devices 110 and provides this information to merchant control 140. In turn, the received location information is shared with the consumer.

After the consumer is enrolled (block 420), the identifier is electronically sent from merchant control 140 to payment provider control 130 where it is stored in database 135 (block 422). Relevant account information is also provided to payment provider control 130, such that a consumer's account may be properly debited and/or credited by payment provider control 130. When ready to make the payment, the consumer goes to one of the previously indicated locations (or another location if the consumer so desires) and provides the identifier via the POS device 110 at the location (block 424). After entry of the identifier, POS device 110 transmits the identifier to payment provider control 130. Payment provider control 130 accesses the consumer's account based on the identifier, determines the amount to be tendered from the consumer, and returns this determined amount to POS device 110. The amount is then displayed on POS device 110 where it can be viewed by either or both of a merchant and the consumer. The determined amount can be displayed along with any other fees associated with the transaction.

In some embodiments, payment provider control 130 calculates additional charges to be collected on behalf of the merchant. The additional charges may include, for example, federal, state and local sales taxes, shipping and handling charges, insurance, and the like. In another embodiment, the merchant has pre-calculated the necessary additional charges. Thus, it will be appreciated by those skilled in the art that the reference to tax calculation and tax information in FIG. 4 represents an embodiment of the present invention, but the invention is not so limited.

The consumer then tenders payment to the merchant, or automatically via POS device 110 where such capability is provided. Upon tendering of payment (block 424), the amount of payment tendered is provided to payment provider control 130 via POS device 110. This payment information is used to create an electronic record of the payment (block 426). This payment information is then sent to merchant 140 associated with the merchant (block 428). In the case of a communications service, this information may also be sent to a switch (block 430). This information can then be used by the switch to immediately add time to a cell phone account or provide other telecommunications features rendered by the switch.

A sum equal to the payment (and in some cases less a transaction fee charged to the merchant) is electronically wired to a bank account of the merchant (block 432). In some instances, the merchant proceeds to fulfill the purchase of the consumer prior to receipt of the wire transfer. Alternatively, in other embodiments, the merchant is notified that the payment has been received by payment provider control 130, upon which the merchant continues to fulfill the consumer's purchase. Some time later, the wire transfer is completed. To fulfill the consumer's purchase, an ordered good may be pulled from inventory and shipped to the consumer or other recipient. Alternatively, a stored value account may be credited upon notification of payment.

In particular embodiments, the payment is not transferred from payment provider control 130 to the merchant until consumer 190 receives purchased goods. Thus, in some instances, the present embodiment can be used as an escrow service. In such embodiments, consumer 190 can be given a limited period after requesting goods using the identifier to dispute the transaction and request return of the payment. If such a dispute is not lodged within a predetermined time frame, the payment is transferred from payment provider control 130 to the merchant. If such a dispute is lodged, the payment may be returned to consumer 190 where sufficient evidence exists that the goods were either not received or returned.

Various embodiments of the present invention also provide for activating a service, such as phone service, utility service, newspaper deliver, or the like. One example of such a process is illustrated as flow diagram 500 of FIG. 5. As illustrated in flow diagram 500, a consumer contacts a merchant to request a service (block 546). An account is set up with the merchant and a record is created containing the information needed to provide the service requested by the consumer. In some embodiments, the account is maintained in database 145 and accessible to the merchant control 140 associated with the merchant. To pay for the service, the consumer is instructed by the merchant to contact a payment provider.

At least some of this account information is transferred from merchant control 140 to payment provider control 130 (block 548). The transferred account information can include the amount of payment needed to have the requested service activated and may be maintained in database 135 associated with payment provider control 130.

The consumer then contacts the payment provider, tenders payment, and requests that the payment be forwarded to the merchant (block 550). Payment may be tendered to a merchant associated with the payment provider. Further, in some cases, payment may be facilitated by accessing POS device 110 located at a merchant location and in communication with payment provider control 130. Additionally, POS device 110 can be used to access the account information maintained in database 135. A display screen on POS device 110 may display the appropriate account information along with the required payment and any service fee. The consumer then makes the payment as provided on the display, and an identifier is issued to the consumer (block 552). For example, a receipt may be printed by a printer in communication with POS device 110 that includes the identifier. Conveniently, the identifier may be assigned to the account by the merchant when the account is created.

The payment received from the consumer is then electronically transferred from the payment provider to a bank account of the merchant. This may be an ACH transfer processed under control of payment provider control 130. In addition, the payment information along with the identifier, is electronically transferred from payment provider control 130 to merchant control 140 (block 556). Upon receiving an indication that the payment has been received by the payment provider, the merchant may then activate the requested service.

Figure 6:
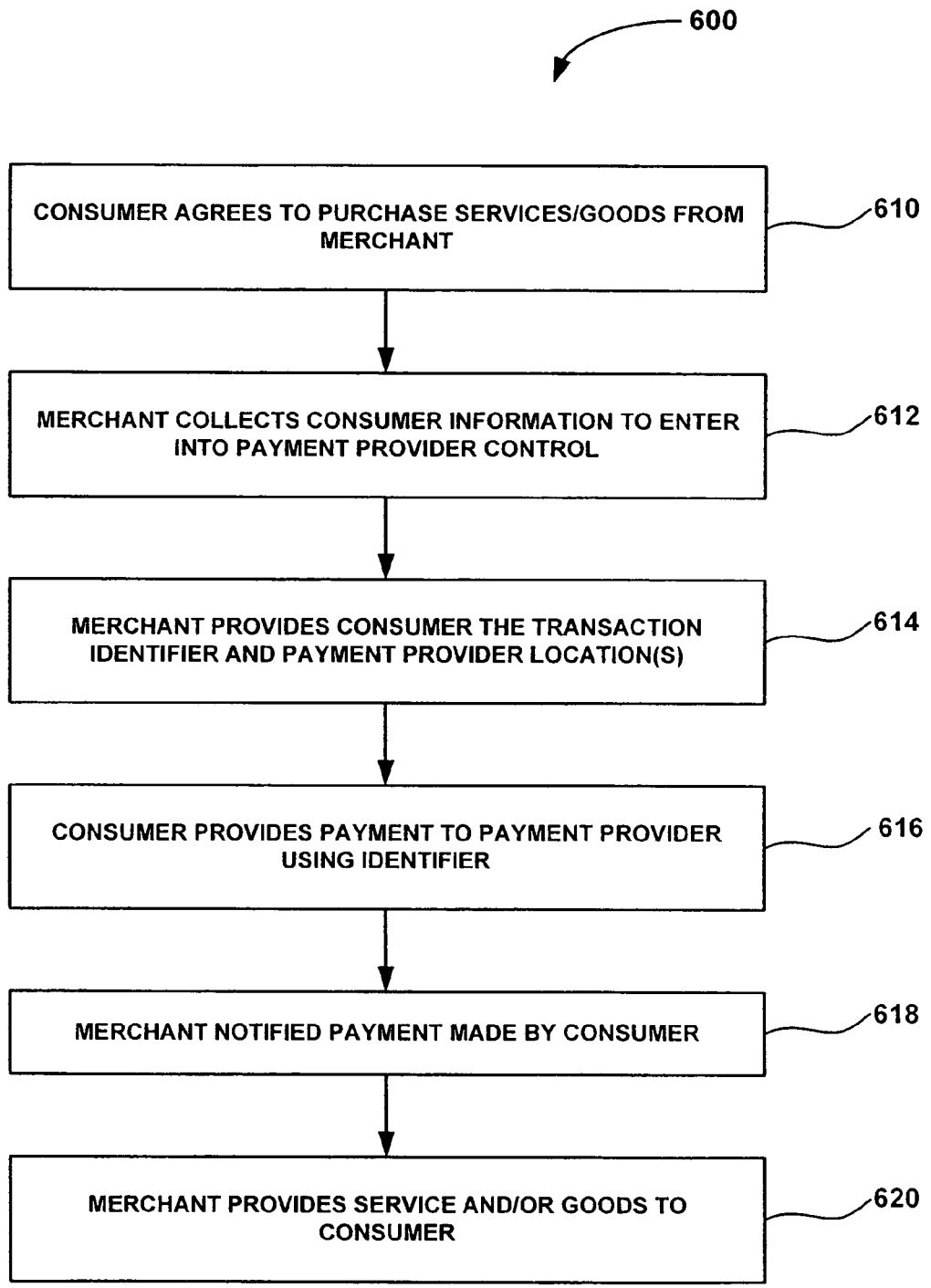
FIGS. 6-9 are flow diagrams illustrating additional embodiments of the present invention.

Another embodiment of the present invention is illustrated as flow diagram 600 of FIG. 6. As illustrated in diagram 600, a consumer agrees to purchase services and/or goods from a merchant (block 610). The merchant collects consumer information to enter into the payment provider control (612). Information to be collected may include a wide range of consumer information including, among other things, the consumer name, address, telephone number, social security number, and the like. Some of the information may be entered into payment provider control 130. The merchant also may enter additional transaction related information, such as a description of the goods or services and the price, including taxes and shipping costs if applicable. The information entered into payment provider control 130, in one embodiment, defines a transaction request.

Entry of information, data, or a transaction request into payment provider control 130 may occur in a variety of ways through any interface 12 (FIG. 2). For example, entry may be made by entering into POS device 110, with or without a card reader, which is coupled to payment provider control 130. Alternatively, the merchant enters the transaction request through merchant control 140, which is linked to payment provider control 130 via communication network 120 (as shown in FIG. 1A).

In one embodiment, the merchant then provides the consumer with a transaction identifier and one or more payment provider locations (block 614). In a particular embodiment, the transaction identifier is provided to the merchant by payment provider control 130, such as in response to the transaction request. Alternatively, the merchant creates or defines the transaction identifier and provides the transaction identifier to both the consumer and the payment provider. In such cases, the identifier may include a receipt number, an invoice number, an order number, or the like, each with a variety of alpha-numeric and/or other characters.

The consumer then provides a payment to payment provider 130 using the transaction identifier (block 616). This may involve, for example, the consumer physically entering the business establishment or location where payment provider control 130 is located, and tendering payment to payment provider control 130 or an operator who operates payment provider control 130. In some embodiments, the consumer must provide identification that matches that contained in the transaction request. This may be particularly important, for example, when the goods being purchased have a legally defined age requirement (e.g., tobacco products, alcohol, firearms, or the like).

In some embodiments, the merchant holds the consumer information in merchant database 145. In such a case, the merchant may provide the transaction identifier to the consumer and payment provider control 140. This may be particularly useful for consumers who wish to remain anonymous with respect to the payment provider. In this embodiment, the consumer provides the transaction identifier to payment provider control 130. Payment provider control 130 associates the transaction identifier with the merchant's transaction request to determine the amount the consumer must tender. In this manner, the consumer identity and/or the goods and services being provided need not be known to the payment provider. The payment provider database indicates that someone with a particular transaction identifier must pay a specified sum of money.

Once the consumer has provided the payment associated with the transaction identifier, the merchant is notified that payment has been made (block 618). This notification may occur in a variety of ways, including for example, by an electronic notification from payment provider control 130 to merchant control 140. This notification may require an inquiry from merchant prior to notification, or alternatively occur without a merchant inquiry. The merchant, upon being notified that payment has been made, is available to provide the service and/or goods to the consumer (block 620).

In accordance with the methods described in conjunction with FIG. 6, consumers, including unbanked consumers have a method for making payment for goods or services in a timely manner. For example, the entire transaction shown in flow diagram 600 may take only a few minutes or hours to complete. Further, the consumer may have multiple payment provider locations at which they can conveniently make payment. For example, if the consumer has limited mobility, or means of transportation, a payment provider location in close proximity to the consumer's residence or place of business would be desired. Further, the merchant stages a transaction as shown in blocks 612 and 614, which facilitates the ease of payment by the consumer upon the consumer's arrival at the payment provider location.

The embodiment depicted in FIG. 6 will find a wide range of uses in the private and commercial sector. By way of example, the consumer may be viewing a televised shopping network (TSN) program or info-mercial having an item the consumer desires to purchase. Typically in these scenarios, the consumer contacts the TSN by telephone to order the product. If the consumer has a credit card, the shopping network accepts a credit card payment via the telephone and, upon confirmation from the credit card company or ACH, ships the goods to the consumer.

For consumers who do not have a credit card or desire another form of payment, the shopping network must wait for payment to arrive physically by check, money order, cash or the like. Payment from such consumers may arrive several days after the televised broadcast or info-mercial promoting the good. For transactions which proceed without complication, this may be an acceptable form of payment for the TSN. However, the likelihood the consumer may have "buyer's remorse" can increase the longer it takes for the consumer to pay for the good. Hence, it may be desirable for the merchant to provide a more expedient means of consumer payment.

In the above example, the TSN would collect the consumer's information, such as by telephone. The TSN then enters a transaction request into payment provider control 130. Again, the transaction request may comprise some or all of the consumer information collected, a name or description of the good purchased, and a price to be paid. In some aspects, the consumer remains anonymous. Entry of the transaction request into payment provider control 130 may occur, for example, by entering the request into POS device 110 as previously described. The TSN then provides the consumer with a transaction identifier, and one or more payment locations. The consumer would make payment at the payment provider location. The payment provider control then notifies the TSN that payment has been received and the consumer may take possession or receive the purchased goods.

In a particular embodiment more fully detailed below, the transaction request also may include a time limit by which the consumer must make payment. The transaction request would include this time limit so payment provider control 130 could determine if the consumer timely paid.

Another example of the usefulness of the embodiment shown in FIG. 6 will now be described. In some circumstances, unscrupulous consumers have been known to order the same item from multiple merchants or sources, all to be shipped to the consumer and paid for in a collect-on-delivery (COD) fashion. The consumer then pays the merchant who first provides the requested good or service. The later arriving goods or services are rejected by the consumer upon delivery. As a result, one or more merchants who are not the first merchant to provide the good or service do not receive payment. These merchants also typically have incurred expenses related to packaging, shipping, and/or insuring the shipped item.

The method as shown in FIG. 6 will reduce or alleviate this concern for merchants, and may be particularly useful for merchants that transact business via the telephone, the Internet, and the like. As shown in FIG. 6, the good or service is not provided by the merchant until the merchant receives a confirmation that payment has been received by the payment provider.

Figure 7:
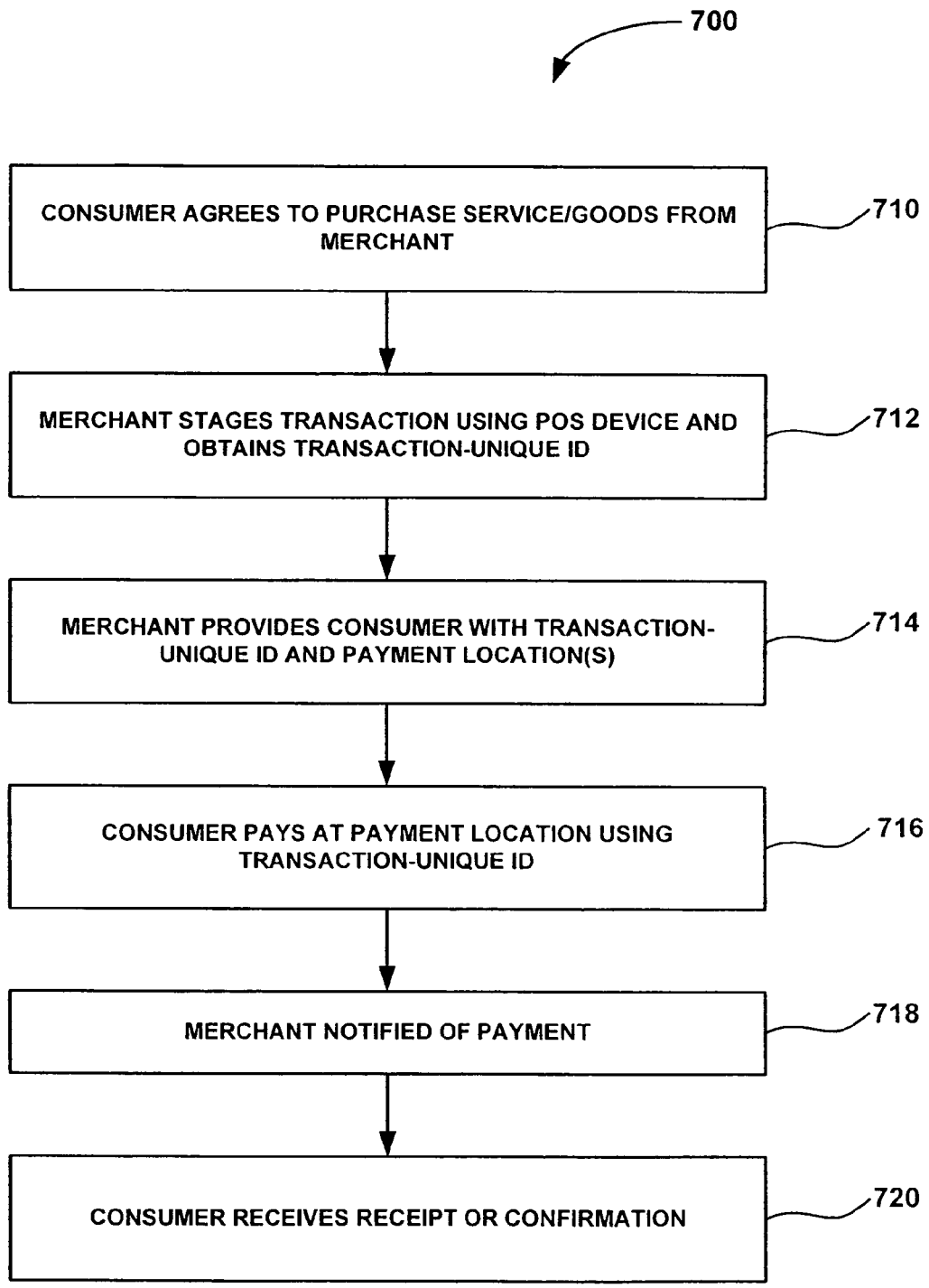

Another embodiment of the present invention is depicted in FIG. 7 as method 700. In this embodiment, the consumer agrees to purchase a service(s) and/or a good(s) from a merchant (block 710). The merchant stages the transaction using POS device 110 and obtains a transaction unique identifier (ID) (block 712). In one embodiment, this transaction is staged in a similar fashion as described in conjunction with prior Figures. In one embodiment, the merchant obtains desired information from the consumer, possibly for entry into payment provider control 130 or merchant control 140. The merchant provides the consumer with the transaction unique ID and one or more payment locations (block 714). The merchant may, but need not, obtain the transaction ID from payment provider control 130. The consumer then effectuates payment at the payment location of choice. Payment is associated with the transaction unique ID which the consumer, in one embodiment, provides at the payment location (block 716). In this manner, payment provider control 130 associates the payment with the transaction unique ID. The transaction unique ID may have a transaction profile associated with it containing necessary information, such as a description of the goods or service to be provided by the merchant.

In one embodiment, a portion or all of the transaction ID corresponds to a particular consumer. For example, in one embodiment a first portion of the transaction ID identifies or is unique to a particular consumer, and a second portion of the ID changes from transaction to transaction. The merchant, payment provider system, and/or the consumer may view or have access to data, including historical data related to the consumer. Such data may include, for example, prior payments made; past transactions executed by the consumer, grouped either globally, by merchant, or the like; future payment schedules, such as may be required for installment purchases; information on late payments, non-payments or other defaults; and a myriad of other data. In this manner, the merchant, payment provider system and/or the consumer may track, view or search transaction data associated with the consumer, based at least in part on the transaction ID. It will be realized by those skilled in the art that the consumer portion of the transaction ID also may be a separate identifier, and may be required to effectuate a transaction which in turn is identified by a transaction unique identifier.

Method 700 includes a notification to the merchant that payment has been made. (block 718). Alternatively, a portion or all of the payment may be transferred to the merchant, such as by electronic transfer to a merchant account. The consumer, in one embodiment, receives a receipt or confirmation (block 720) associated with the goods or services. In this manner, the consumer has a physical document or other payment confirmation which may be used in other embodiments of the present invention.

The method as described in FIG. 7 will have a wide range of uses. In one embodiment, the merchant is an airline, or other transportation company. In this embodiment, the airline merchant stages a transaction for an airline ticket consumer or customer. The customer makes payment at the payment location (block 716) and receives the receipt or confirmation (block 720). In this embodiment, the receipt or confirmation may comprise an electronic ticket or e-ticket. The electronic ticket may then be returned to the airline at the departure airport on the day the consumer is scheduled to fly. In this manner, the merchant or airline stages the transaction with an airline customer without the need for an intermediary, such as a travel agent. Further, the customer can be a customer who does not have a credit card and must make payment via cash, check or by some other means. It will be appreciated by those skilled in the art that the customer, in this and other examples, may also pay by credit card, debit card or the like at the payment provider location. This may be desired from a customer view point, for example, if the customer needs additional time after scheduling the flight prior to making payment. It will also be appreciated by those skilled in the art that this particular embodiment is equally applicable to alternative transportation companies as well as a wide range of other businesses. For example, train travel, cruises, bus travel and the like all may be effectuated using method 700.

In another embodiment, the merchant is a member of the lodging industry, such as a hotel, motel, resort, or the like. For example, a ski resort can reserve lodging and/or other activities for a consumer who contacts the resort, or a reservation service, by telephone or the Internet. The reservation is placed, and the consumer is provided with one or more locations at which to make payment. Again, this may occur at a payment provider location, or at a POS device location. Once the consumer effectuates payment, the resort is notified and the reservation is finalized. This may involve, for example, sending the consumer an itinerary or confirmation by fax, email, mail and/or telephone. The resort also may place a time limit on the payment, giving the consumer a specified period of time by which to pay for the reservation. If payment is not made within the specified time, the merchant may decide to accept partial payment, may cancel the reservation, or the like.

In another embodiment, the consumer receives the designated good(s) or service(s) in block 720. This may occur, for example, in the event the good purchased by the consumer includes or consists entirely of information or data. For example, the good may be a description of how to solve a problem, instructions desired by the consumer, a paper or other voucher redeemable for a future good or service, other data packages, or the like. In such cases, the POS device and/or payment provider control may immediately provide the good, service, voucher, or the like, upon confirmation payment has been received.

Figure 8:
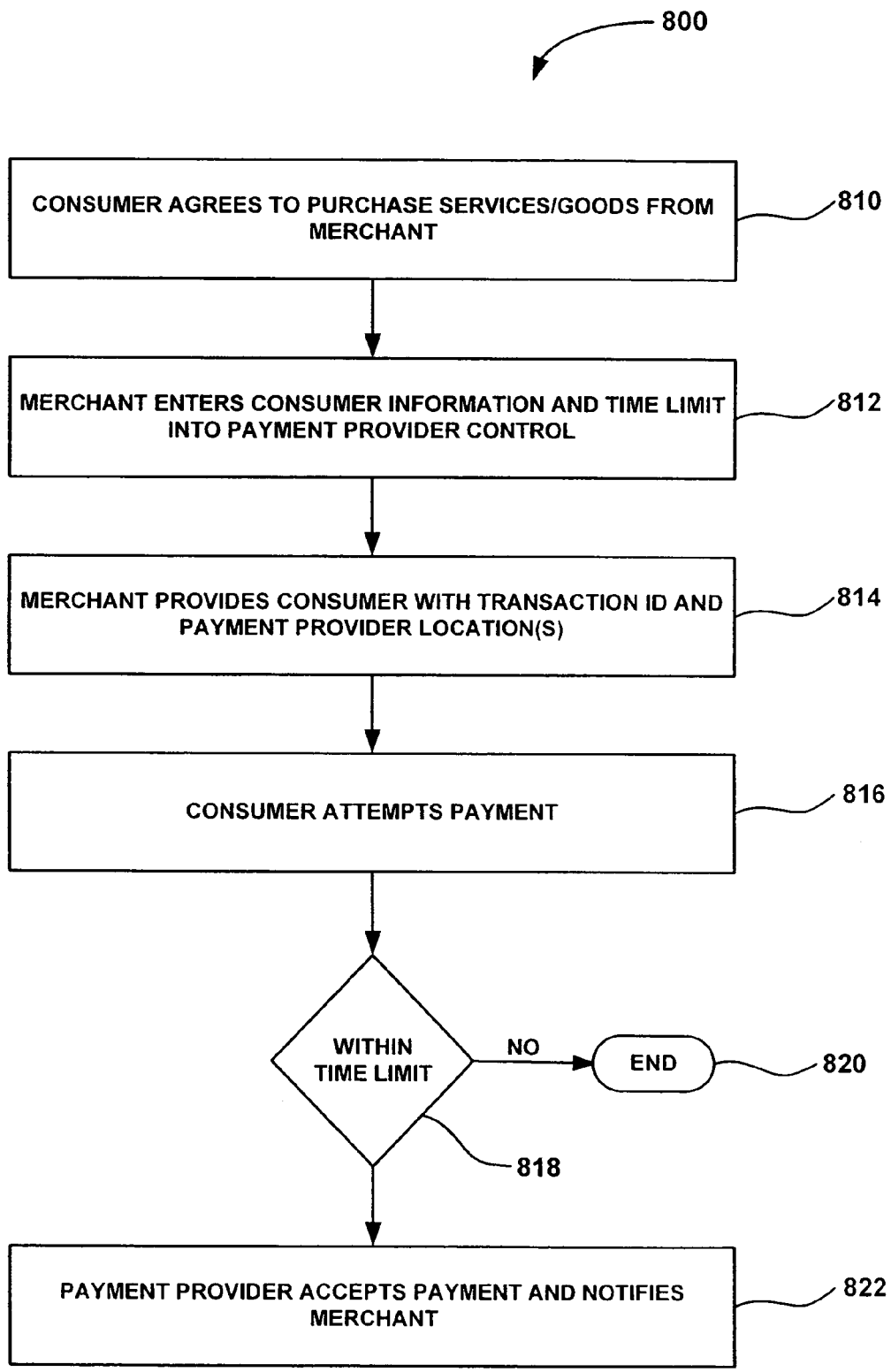

Still another embodiment of the present invention is described in conjunction with FIG. 8. In FIG. 8, method 800 includes the consumer agreeing to purchase a service or goods from the merchant (block 810). The merchant enters a transaction request into payment provider control 130 in order to stage the transaction. Again, the transaction request may contain some or all of the consumer information, information related to the goods and/or services, the merchant, and the like. Entry of the transaction request into payment provider control 130 may be effectuated by entry into POS device 110, merchant control 140, directly into payment provider control 130, and the like.

In this embodiment, the merchant desires to place a time limit on the transaction by which the consumer must pay for the goods or service. This time limit preferably is entered into payment provider control 130 (block 812). The merchant then provides the consumer with a transaction identifier unique to the transaction request, consumer, requested goods or services, time limit, or the like. The merchant or payment provider control 130 further provides the consumer with one or more payment provider locations (block 814).

The consumer attempts to make payment (block 816) at some later point in time at one of the payment provider locations. Payment may be attempted, for example, when the consumer provides payment provider control 130 with the transaction identifier previously received from the merchant.

In this embodiment, payment provider control 130 determines whether the consumer's attempted payment has been made within the time limit (block 818). If the consumer has not made payment within the specified time limit, the payment, in one embodiment, is rejected and the transaction is terminated prior to completion (block 820). The merchant is notified that the transaction has not been completed. In some aspects, the reason(s) why the transaction has been terminated is provided to the merchant (e.g., time limit expired before payment attempt, payment attempt with insufficient funds, no payment attempted, correct transaction identifier not provided, and the like). In this embodiment, the consumer will need to recontact the merchant so that the merchant, if desired, can restage the transaction in order to provide the consumer with additional time to tender payment.

If the initial payment attempt by the consumer is within the time limit, payment provider control 130 accepts the payment (block 822). Payment provider control 130 also may notify the merchant, and/or transfer part or all of the payment to the merchant or a merchant account. In one aspect, the payment provider control 130 contacts the merchant if the consumer attempts to pay only a portion of the requested payment. In this manner, the merchant can decide if they will accept a partial payment.

The embodiment depicted in FIG. 8 will have multiple benefits, particularly for merchants selling time critical goods or services. For example, the airline example described in conjunction with FIG. 7 may involve an airline which requires payment by the end of the same calendar day on which the consumer agrees to purchase the ticket. If the consumer does not attempt payment at one of the payment provider locations by the end of the day, the seat held for the consumer is released to the general buying public. The consumer then must recontact the airline merchant to restage the transaction.

Another example of the benefit of FIG. 8 relates to the televised shopping network example described in conjunction with FIG. 6. For example, the TSN may want to sell a limited number of a particular item during the TSN broadcast. Most of the items may be sold by telephone to consumers having credit card information which is immediately provided during the TSN broadcast or rebroadcast. For unbanked customers, customers without credit cards, customers who desire an alternative payment method, and the like, the TSN can stage the transaction as shown in FIG. 8. In this case, the TSN can require that the consumer attempt payment at the payment provider location in a very short period of time, perhaps within a matter of hours or even minutes. By placing a payment time limit on the TSN consumer, the TSN may reduce or eliminate occurrences of buyer's remorse. The time limit also may assist the TSN in ensuring that all of the particular items are sold during the broadcast. For example, if the TSN intends to sell 100 identical items, 98 of which are sold to credit card customers during the televised program, the two remaining items may be sold in accordance with FIG. 8. In this manner, the consumer may be required to pay for the item at a payment provider location prior to the end of the televised program. In the event the consumer does not complete the transaction by making the necessary payment at the payment provider location, the TSN can resell the two remaining items without the need for a separate broadcast.

Another example of the benefit of the present invention involves the use of the methods of FIGS. 6-8 for a utility company. For example, a utility such as an electric company, may have a delinquent customer one or more months behind in payment for electrical or gas service. A utility company official, meter reader, or the like may contact the customer by telephone, in person at the customer's residence, or the like, to inform the customer that service will be terminated unless payment is immediately rendered. The utility personnel then stages the payment transaction, such as shown in FIG. 8, and provides the delinquent customer with a transaction identifier. The customer then can make payment at the payment provider location within the time limit. Alternatively, the utility official can stage the transaction using POS 110, and accept payment. If the customer is unable or unwilling to do so, the utility may terminate service or take other appropriate action.

In a similar manner, the methods described in conjunction with FIGS. 6-8 may be particularly useful for individuals moving to a new neighborhood, city, state or country. For example, a college student moving out of state and establishing a residence on or off campus may have to arrange telephone service or other utility service. Typically, utility service for new customers, particularly customers with a poor credit history or no credit history, requires a deposit prior to service activation. Using the embodiment shown in FIGS. 6-8, the utility can stage a transaction as previously described, and provide the student one or more payment provider locations at which to render payment of the deposit. Once payment has been rendered, the utility service can be activated.

Figure 9:
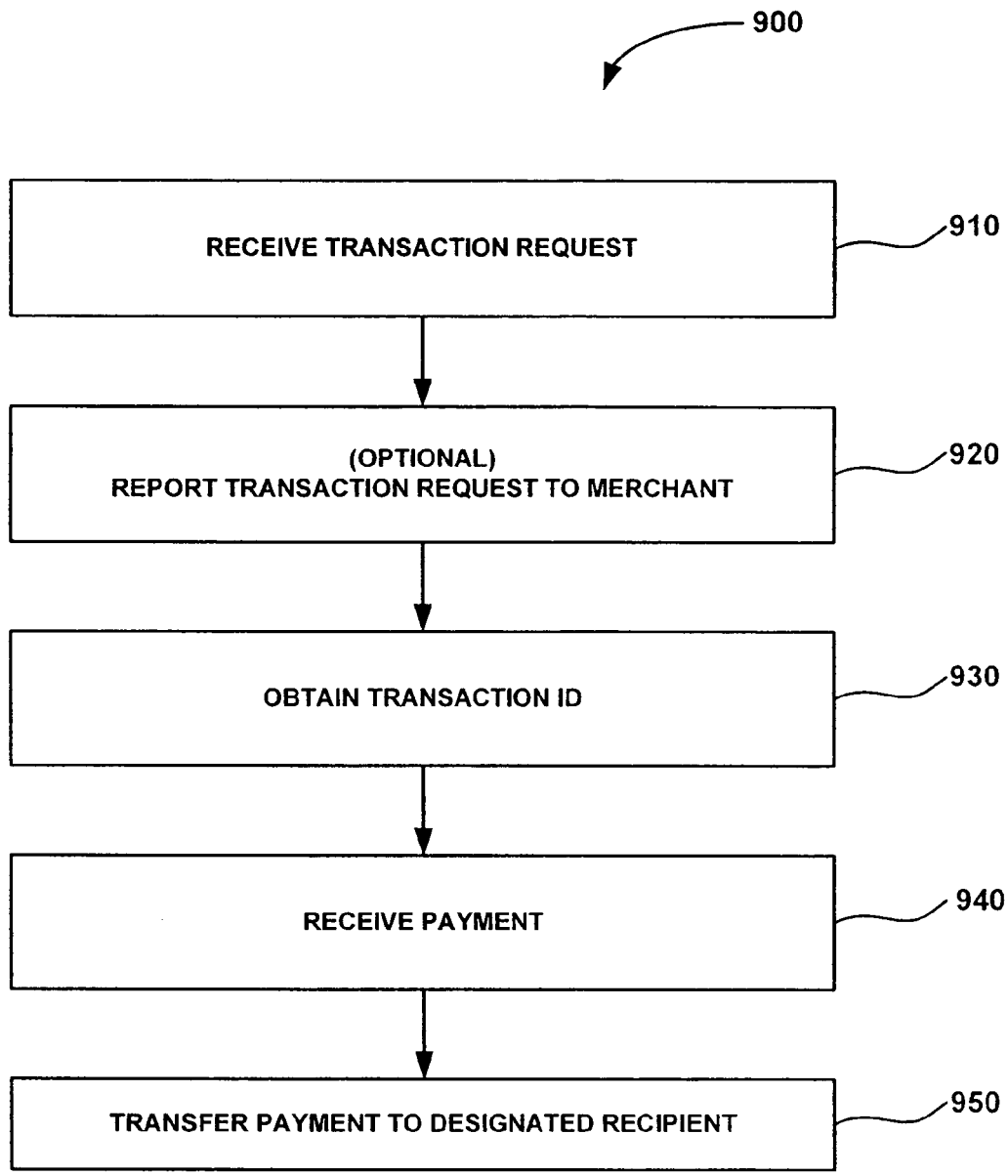

Another embodiment of the present invention may be understood with reference to FIG. 9, which depicts a simplified schematic of a method 900. Method 900 includes receiving a transaction request from a consumer (block 910). Method 900 may optionally include reporting the transaction request to a merchant (block 920). This reporting may occur, for example, in the event the consumer is initiating or completing a transaction with a merchant for a desired good or service. Method 900 further includes obtaining a transaction identifier (block 930). In alternative embodiments, the transaction identifier is obtained from a merchant, and/or from a payment provider control. In another embodiment, the consumer creates or provides the transaction identifier.

Method 900 further includes receiving payment associated with the transaction identifier (block 940). For embodiments in which the consumer consummates a transaction with a merchant, the payment may be received from the consumer or an agent of the consumer. Payment may be received at a POS device, a payment provider control location, via computer or telephone, or other device linked to a payment provider control, or the like, including by additional methods described herein. In other embodiments, however, the payment is not received from the consumer as further described below.

Method 900 still further includes transferring payment to a designated recipient (block 950). In one embodiment, the designated recipient is a merchant, such as may occur if the merchant is providing the consumer with a good or service. Alternatively, the consumer may stage the transaction for an alternative designated recipient.

One example of method 900 according to the present invention may involve an individual, such as a college student, who desires a certain amount of money. In this example, the student may stage the transaction as generally outlined in FIG. 9 by inputting a transaction request. This may occur, for example, by inputting the request directly into a POS device, a payment provider control, a computer or other device linked with a payment provider control, or the like. The student obtains a transaction identifier and associates a desired amount of funds with the transaction ID. For example, if the student needs two hundred dollars ($200.00) to purchase textbooks, the student may stage the transaction for this amount. Once the transaction has been staged, the student then provides the transaction identifier to a parent, guardian, sibling, friend, relative or the like, who the student believes will be receptive to the request for money. Assuming, for example, the parents of the student will be providing the funds, the parent(s) proceed to a convenient or designated location, which may include a POS device location, a payment provider control location, or the like.

Payment is rendered as indicated in block 940 using the transaction identifier to ensure the payment is matched to the proper transaction. The payment is subsequently transferred to the designated recipient (block 950). In this case, the consumer (student) has designated themselves as the recipient. In this manner, the student can obtain finds for a desired purpose in a short period of time and with the assistance of the funds provider (e.g., parents). The transfer of funds to the student or designated recipient may occur in a number of ways, including by transfer into a student account. Alternatively, the student may obtain the funds at a payment provider control location. In still another embodiment, the student stages the transaction for the book purchase, and the designated recipient is the merchant (e.g., bookstore). The student then may provide the transaction identifier to the merchant to confirm payment has been transferred and to obtain the textbooks.

In an alternative embodiment, a third party stages the transaction. This may occur in the above scenario, for example, if the parent stages the transaction for the student. In this case, the parent may stage the transaction and also render payment. The designated beneficiary may be the student, the merchant, or both. It will be appreciated by those skilled in the art that the above example is one of a wide range of uses of method 900 within the scope of the present invention.

The invention has now been described in detail for purposes of clarity and understanding. It will be appreciated by those skilled in the art that the examples described herein comprise a small subset of the possible uses of the methods in accordance with the present invention. It also will be appreciated that certain changes and modifications to the systems and methods of the present invention may be practiced within the scope of the appended claims. For example, a number of forms of system 100 may be implemented in accordance with the present invention. More particularly, system 100 can include any number of POS devices 110, payment provider controls 130, and/or merchant controls 140. Further, system 100 can be configured exclusively as an enrollment system, exclusively as a payment system, or as some combination of payment and enrollment system. Further, the functions of the systems and methods of using such are merely exemplary. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A computer implemented method for staging a transaction, wherein payments are accepted from a consumer for a good or service provided by a merchant, where the goods or services are ordered on behalf of a consumer by a third party, the method comprising:

a payment service provider receiving, in response to transactions in which goods or services are ordered by one or more third parties rather than the consumer, transaction requests from the merchant, the transaction requests comprising a set of transaction identifiers, the set of identifiers associated with consumer purchases;

storing the transaction requests in a consumer database accessible by the payment service provider;

receiving a payment at the payment service provider from the consumer, including receiving a transaction identifier from the consumer that corresponds to the transaction request;

using a computer to associate the payment with the transaction request and transaction identifier and to establish a payment account with the payment service provider that reflects the payment; and sending at least a portion of the payment in the payment account to the merchant.

2. The method as in claim 1, further comprising storing a record of the payment and the associated transaction request in a database.

3. The method as in claim 1, further comprising:
receiving an inquiry from the merchant as to whether the payment was made by the consumer; and
sending a reply to the merchant in response to the inquiry.

4. The method as in claim 1, further comprising providing an indication to the merchant that the payment was made by the consumer.

5. The method as in claim 1, wherein sending at least the portion of the payment to the merchant comprises electronically sending at least the portion of the payment to an account of the merchant.

6. The method as in claim 1, wherein the transaction request comprises a consumer profile.

7. The method as in claim 6, further comprising verifying a consumer identity against the consumer profile.

8. The method as in claim 1, wherein the transaction request comprises a time limit, and wherein associating the payment with the transaction request comprises:
accepting the payment if receiving the payment occurs within the time limit; and
rejecting the payment if receiving the payment does not occur within the time limit.

9. The method as in claim 1, wherein the consumer is physically present at a payment service provider location when making payment.

10. The method as in claim 1, wherein the consumer data base is operated by the payment service provider.

11. The method as in claim 1, further comprising providing a confirmation to the consumer after the receiving the payment.

12. The method as in claim 11, wherein the confirmation comprises a certificate reflecting the good or service provided by the merchant.

13. The method as in claim 1, further comprising providing the good to the consumer on behalf of the merchant.

14. The method as in claim 13, wherein the good comprises a data package.

15. The method as in claim 1, further comprising providing the consumer with a location of at least one payment location.

16. The method as in claim 11, wherein the confirmation is selected from a group consisting of a receipt, an electronic ticket, a gift certificate, an award, a redeemable coupon, and a voucher.

17. A computer implemented method for accepting payments from a consumer for a good or service provided by a merchant, the method comprising:
a payment service provider receiving transaction requests from the merchant, the transaction requests comprising a set of transaction identifiers, the set of identifiers associated with consumer purchases;
storing the transaction requests in a consumer database accessible by the payment service provider;
receiving a payment at the payment service provider from the consumer, including receiving a transaction identifier from the consumer that corresponds to the transaction request;
using a computer to associate the payment with the transaction request and transaction identifier and to establish a payment account with the payment service provider that reflects the payment;
sending at least a portion of the payment in the payment account to the merchant; and
providing a confirmation to the consumer from the payment service provider after the receiving the payment at the payment service provider from the consumer, the confirmation reflecting the good or service being provided by the merchant.

18. The method as in claim 17, wherein the confirmation is a data package.

19. The method as in claim 17, wherein the confirmation is selected from a group consisting of a receipt, an electronic ticket, a gift certificate, an award, a redeemable coupon, and a voucher.

20. A computer implemented method for accepting payments from a consumer for a good or service provided by a merchant, the method comprising:
a payment service provider receiving transaction requests from the merchant, the transaction requests comprising a set of transaction identifiers, the set of identifiers associated with consumer purchases;
storing the transaction requests in a consumer database accessible by the payment service provider;
receiving a payment at the payment service provider from the consumer, including receiving a transaction identifier from the consumer that corresponds to the transaction request;
using a computer to associate the payment with the transaction request and transaction identifier and to establish a payment account with the payment service provider that reflects the payment;
transferring at least a portion of the payment in the payment account from the payment service provider to the merchant, wherein the payment service provider waits a predetermined period of time after establishing the payment account and before transferring payment to the merchant, in order to provide the consumer such period of time to dispute the transaction and request return of the payment from the payment service provider; and
providing a confirmation to the consumer from the payment service provider after receiving the payment at the payment service provider from the consumer, the confirmation reflecting the good or service being provided by the merchant.

21. The method as in claim 20, wherein the payment is transferred from the payment service provider to the merchant if a dispute is not lodged by the consumer within the predetermined period of time.

22. A computer implemented method for accepting payments for transactions between a consumer and a merchant related to a good or service provided by the merchant to the consumer, the method comprising:
a payment service provider receiving transaction requests from the merchant, the transaction requests comprising a set of transaction identifiers, the set of identifiers associated with consumer transactions, wherein each transaction identifier comprises first and second portions, wherein the first portion is associated with and is capable of identifying the consumer and the second portion is associated with a specific transaction;

storing data, including the transaction requests and data relating to the consumer, in a consumer database accessible by the payment service provider;

receiving a payment at the payment service provider from the consumer, including receiving a transaction identifier from the consumer that corresponds to the transaction request for a current transaction;

using a computer to associate the payment with the transaction request and transaction identifier and to establish a payment account with the payment service provider that reflects the payment for the current transaction;

sending at least a portion of the payment in the payment account to the merchant; and separately accessing the consumer database with the first portion of the transaction identifier only and apart from using the computer to associate a payment with the transaction request, so data relating to the consumer may be accessed in the consumer database using the first portion of the transaction identifier.

23. The method as in claim 22, wherein the data relating to the consumer which may be accessed using the first portion of the transaction identifier is selected from a group consisting of prior payments made, past transactions executed by the consumer, future payment schedules, information on late payments, information on non-payments, and information on defaults.

\* \* \* \* \*